US012750710B2

(12) United States Patent
Lee et al.

(10) Patent No.: US 12,750,710 B2
(45) Date of Patent: Sep. 29, 2026

(54) METHOD AND APPARATUS FOR MEASURING OF UE-TO-UE CROSSLINK INTERFERENCE IN WIRELESS COMMUNICATION SYSTEM

(71) Applicant: Samsung Electronics Co., Ltd., Suwon-si (KR)

(72) Inventors: Kwonjong Lee, Suwon-si (KR); Minchul Kim, Suwon-si (KR); Juho Lee, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 18/480,209

(22) Filed: Oct. 3, 2023

(65) Prior Publication Data

US 2024/0121649 A1 Apr. 11, 2024

(30) Foreign Application Priority Data

Oct. 5, 2022 (KR) ........................ 10-2022-0127032

(51) Int. Cl.
*H04B 17/20* (2015.01)
*H04B 17/318* (2015.01)
(Continued)

(52) U.S. Cl.
CPC .......... *H04W 24/10* (2013.01); *H04B 17/252* (2023.05); *H04B 17/328* (2023.05);
(Continued)

(58) Field of Classification Search
CPC ..... H04B 7/02–12; H04B 17/0082–409; H04J 11/0023–0066;
(Continued)

(56) References Cited

U.S. PATENT DOCUMENTS 11,202,218 B2 12/2021 Kim et al.
2014/0204765 A1 7/2014 Chai et al.
(Continued)

FOREIGN PATENT DOCUMENTS

KR 20100117866 A 11/2010
KR 10-2019-0097172 A 8/2019
(Continued)

OTHER PUBLICATIONS

Huawei et al. "UE-to-UE measurement for cross-link interference mitigation", R1-1801798, 3GPP TSG RAN WG1 Meeting #92, Athens, Greece, Feb. 26-Mar. 2, 2018, 13 pages. (Year: 2018).*
(Continued)

*Primary Examiner* — Timothy J Weidner

(57) ABSTRACT

The present disclosure relates to a 5G communication system or a 6G communication system for supporting higher data rates beyond a 4G communication system such as long term evolution (LTE). Particularly, a method for operating a UE in a wireless communication system according to various embodiments of the present disclosure may include a step of receiving, from a base station, information indicating that CLI measurement is triggered by identifying the UE as a victim UE, a step of receiving one or more cell-level reference signals from one or more UEs in a second cell adjacent to a first cell in which the UE is positioned, after the CLI measurement is triggered, and a step of transmitting, to the base station, a cell-level measurement report including a result of measuring RSRP of the one or more received cell-level RSs.

10 Claims, 38 Drawing Sheets

Cell-level CLI measurement

(51) Int. Cl.
*H04W 24/08* (2009.01)
*H04W 24/10* (2009.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ............ *H04W 24/08* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ............ H04L 5/0001–0098; H04W 24/02–10; H04W 72/02–569; H04W 84/02–16; H04W 88/02–12; H04W 92/02–24
See application file for complete search history.

(56) References Cited

U.S. PATENT DOCUMENTS

2021/0006997 A1* 1/2021 Jin ........................ H04W 24/10
2022/0069928 A1 3/2022 Hwang et al.
2022/0086672 A1 3/2022 Abedini et al.
2022/0095240 A1 3/2022 Ying et al.
2022/0158782 A1 5/2022 Qi
2024/0089019 A1* 3/2024 Xu ........................ H04W 24/10

FOREIGN PATENT DOCUMENTS

WO WO-2020164126 A1 * 8/2020 ............ H04W 24/10
WO 2023128080 A1 7/2023

OTHER PUBLICATIONS

International Search Report and Written Opinion of the International Searching Authority dated Jan. 9, 2024, in connection with International Application No. PCT/KR2023/014406, 8 pages.
Huawei et al. "UE-to-UE measurement for cross-link interference mitigation", R1-1801798, 3GPP TSG RAN WG1 Meeting #92, Athens, Greece, Feb. 26-Mar. 2, 2018, 13 pages.
Supplementary Partial European Search Report dated Jul. 15, 2025, in connection with European Application No. 23875127.5, 11 pages.
MediaTek Inc., "Cross-link interference management," R1-1716217, 3GPP TSG RAN WG1 Meeting NR#3, Nagoya, Japan, Sep. 18-21, 2017, 5 pages.
Supplementary European Search Report dated Nov. 11, 2025, in connection with European Application No. 23875127.5, 12 pages.

* cited by examiner

※ Assumption: number of terminals per cell is N apiece

▲ : Victim base station ▲ : Victim base station ▩ : Victim terminal

□ : Inter-cell aggressor terminal

▩ : Intra-cell potential aggressor terminal

▩ : Aggressor terminal (may be multiple terminals)

⬡ : Aggressor cell (may be multiple cells)

Cell-level CLI measurement

<Method for transmitting cell-level SRS>

<When multiple terminals simultaneously measure CLI in multi-cell environment>

<UE-level CLI measurement>

<Method for transmitting UE-level SRS (inter-cell)>

<Method for transmitting UE-level SRS (intra-cell)>

<Case of ii>

<Case 2>

| cell ID (PCI) | starting RB | RB length | comb size | comb offset | starting slot | starting symbol | starting length | sequence ID | periodicity | TX power |
|---|---|---|---|---|---|---|---|---|---|---|
| ... | ... | ... | ... | ... | ... | ... | ... | ... | ... | ... |
| 323 | 4 | 48 | 4 | 2 | 4 | 8 | 2 | 323 | 20 ms | Max |
| ... | ... | ... | ... | ... | ... | ... | ... | ... | ... | ... |

FIG.22

<Case 1>

| cell ID (PCI) | starting RB | RB length | comb size | comb offset | starting slot | starting symbol | symbol length | sequence ID | periodicity | TX power | intra/inter |
|---|---|---|---|---|---|---|---|---|---|---|---|
| ... | ... | ... | ... | ... | ... | ... | ... | ... | ... | ... | ... |
| 323 | 4 | 48 | 4 | 2 | 4 | 8 | 2 | 323 | 20 ms | Max | inter |
| 323 | 4 | 48 | 4 | 2 | 12 | 8 | 2 | 323 | 20 ms | Max | intra |
| ... | ... | ... | ... | ... | ... | ... | ... | ... | ... | ... | ... |

FIG.32

<Example of application>

□ : Victim terminal

⑤ which is cell most adjacent to victim terminal of ④ is except from cell-level measurement
(UE-level measurement is performed instantly)
Cell-level measurement is performed with regard to remaining ①,②,③,⑥,⑦

METHOD AND APPARATUS FOR MEASURING OF UE-TO-UE CROSSLINK INTERFERENCE IN WIRELESS COMMUNICATION SYSTEM

CROSS-REFERENCE TO RELATED APPLICATION

This application is based on and claims priority under 35 U.S.C. 119 to Korean Patent Application No. 10-2022-0127032, filed on Oct. 5, 2022, in the Korean Intellectual Property Office, the disclosure of which is herein incorporated by reference in its entirety.

BACKGROUND

1. Field

The present disclosure relates generally to a wireless communication system and, more particularly, to a method and an apparatus for measuring UE-to-UE crosslink interference in a wireless communication system.

2. Description of Related Art

Recently, there have been increasing demands for a scheme for measuring UE-to-UE crosslink interference effectively in order to improve communication quality.

The above information is presented as background information only to assist with an understanding of the present disclosure. No determination has been made, and no assertion is made, as to whether any of the above might be applicable as prior art with regard to the present disclosure.

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 sec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

According to various embodiments disclosed herein, a method for operating a UE in a wireless communication system may include: receiving, from a base station, information indicating that crosslink interference (CLI) measurement is triggered by identifying the UE as a victim UE; receiving one or more cell-level reference signals (RSs) from one or more UEs in a second cell adjacent to a first cell in which the UE is positioned, after the CLI measurement is triggered; and transmitting, to the base station, a cell-level measurement report including a result of measuring reference signal received power (RSRP) of the one or more received cell-level RSs, wherein the one or more cell-level RSs are received with an identical sequence on an identical radio resource.

According to various embodiments disclosed herein, a method for operating a base station in a wireless communication system may include: in case that channel quality information included in a channel status information (CSI) report received from a UE is smaller than a first threshold, identifying the UE as a victim UE; transmitting, to the victim UE, information indicating that CLI measurement is triggered; receiving, from the UE, cell-level measurement report including a result of measuring reference signal received power (RSRP) of multiple cell-level reference signals (RSs) of multiple cells adjacent to a first cell in which the UE is positioned, after the CLI measurement is triggered; and identifying, based on the cell-level measurement report, a cell corresponding to RSRP equal to/higher than a second threshold as an aggressor cell, wherein the multiple cell-level RSs are transmitted with an identical sequence on an identical radio resource, and the first threshold and the second threshold are different from each other.

According to various embodiments disclosed herein, a UE device in a wireless communication system may include a transceiver, a memory, and a controller, wherein the controller is configured to: receive, from a base station, information indicating that crosslink interference (CLI) measurement is triggered by identifying the UE as a victim UE; receive one or more cell-level reference signals (RSs) from one or more UEs in a second cell adjacent to a first cell in which the UE is positioned, after the CLI measurement is triggered; and transmit, to the base station, a cell-level measurement report including a result of measuring reference signal received power (RSRP) of the one or more received cell-level RSs, and wherein the one or more cell-level RSs are received with an identical sequence on an identical radio resource.

According to various embodiments disclosed herein, a base station device in a wireless communication system may include a transceiver, a memory, and a controller, wherein the controller is configured to: in case that channel quality information included in a channel status information (CSI) report received from a UE is smaller than a first threshold, identify the UE as a victim UE; transmitting, to the victim UE, information indicating that CLI measurement is triggered; receive, from the UE, cell-level measurement report including a result of measuring reference signal received power (RSRP) of multiple cell-level reference signals (RSs) of multiple cells adjacent to a first cell in which the UE is positioned, after the CLI measurement is triggered; and identify, based on the cell-level measurement report, a cell corresponding to RSRP equal to/higher than a second threshold as an aggressor cell, and wherein the multiple cell-level RSs are transmitted with an identical sequence on an identical radio resource, and the first threshold and the second threshold are different from each other.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 22 illustrates a table of mapping between cell IDs and SRS resources according to various embodiments of the present disclosure;

FIG. 32 illustrates a mapping table of SRS resources for intra-cell and inter-cell CLI measurements according to various embodiments of the present disclosure;

DETAILED DESCRIPTION

FIGS. 1 through 37, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

Hereinafter, the present disclosure relates to a method and an apparatus for measuring UE-to-UE crosslink interference (CLI) in a wireless communication system. Particularly, in the present disclosure, an operation method for enabling a terminal to efficiently measure UE-to-UE CLI in a wireless communication system may be described. In order for the terminal to efficiently measure UE-to-UE CLI, CLI measurement may be divided into two steps (an inter-cell CLI measurement step and an intra-cell CLI measurement step) and described.

Figure 1:
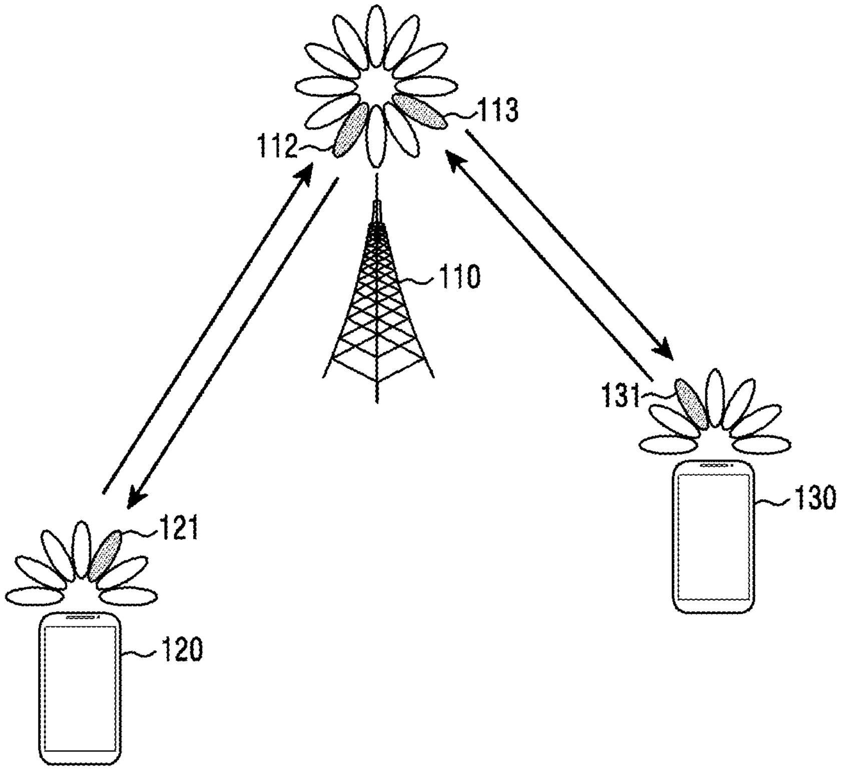
FIG. 1 illustrates a wireless communication system according to various embodiments of the present disclosure.

FIG. 1 illustrates a wireless communication system according to various embodiments of the present disclosure. FIG. 1 illustrates an example of a base station 110, a terminal 120, and a terminal 130 as a part of nodes that use a radio channel in a wireless communication system. Although FIG. 1 illustrates only one base station, base stations identical or similar to the base station 110 may be further included.

The base station 110 is a network infrastructure configured to provide wireless connection to the terminals 120 and 130. The base station 110 has a coverage defined as a predetermined geographical region based on the distance to which signals can be transmitted. The base station 110 may be also be referred to as “access point (AP)”, “eNodeB (eNB)”, “5th generation node (5G node)”, “next generation nodeB (gNB)”, “wireless point”, “transmission/reception point (TRP)”, or other terms having equivalent technical meanings, in addition to “base station”.

Each of the terminal 120 and the terminal 130 refers to a device used by a user to perform communication with the base station 110 through a radio channel. In some cases, at least one of the terminal 120 and the terminal 130 may be operated without the user’s intervention. That is, at least one of the terminal 120 and the terminal 130 may be a device configured to perform machine type communication (MTC) without being carried by the user. Each of the terminal 120 and the terminal 130 may also referred to as “user equipment (UE)”, “mobile station”, “subscriber station”, “remote terminal”, “wireless terminal”, “user device”, or other terms having equivalent technical meanings, in addition to “terminal”.

The base station 110, the terminal 120, and the terminal 130 may transmit and receive radio signals in mmWave bands (for example, 28 GHz, 30 GHz, 38 GHz, and 60 GHz). The base station 110, the terminal 120, and the terminal 130 may perform beamforming to improve channel gain. Beamforming, as used herein, may include transmission beamforming and reception beamforming. That is, the base station 110, the terminal 120, and the terminal 130 may assign directivity to transmitted or received signals. To this end, the base station 110 and the terminals 120 and 130 may select serving beams 112, 113, 121, and 131 through a beam search or beam management procedure. After the serving beams

112, 113, 121, and 131 are selected, subsequent communication may be performed through resources having a quasi co-located (QCL) relation with resources used to transmit the serving beams 112, 113, 121, and 131.

If large-scale characteristics of a channel used to transfer a symbol on a first antenna port can be inferred from a channel used to transfer a symbol on a second antenna port, the first and second antenna ports may be assessed as having a QCL relation. For example, the large-scale characteristics may include at least one of delay spread, doppler spread, doppler shift, average gain, average delay, and spatial receiver parameter.

Figure 2:
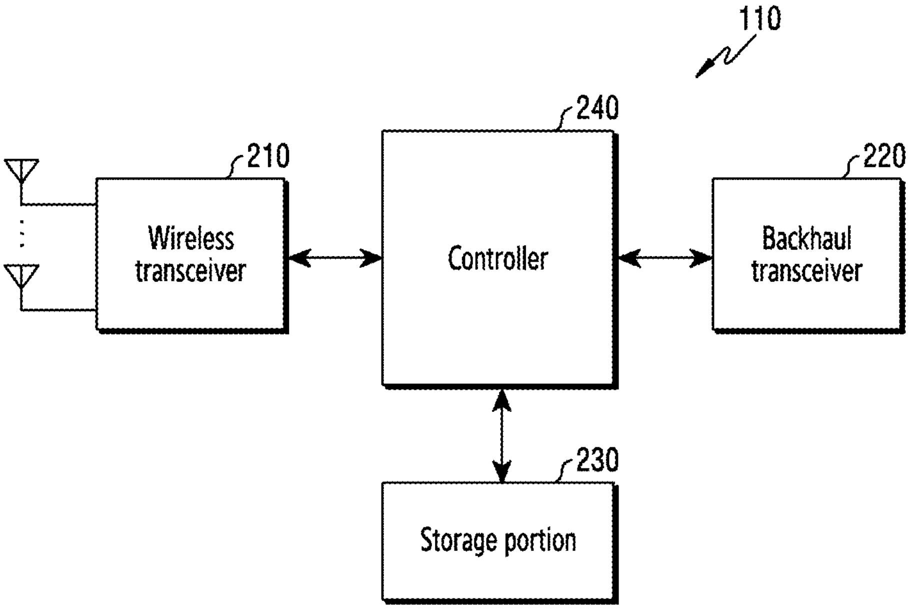
FIG. 2 illustrates a configuration of a base station in a wireless communication system according to various embodiments of the present disclosure.

FIG. 2 illustrates a configuration of a base station in a wireless communication system according to various embodiments of the present disclosure. The exemplary configuration illustrated in FIG. 2 may be understood as the configuration of the base station 110. As used herein, terms such as "portion" and "-er" refer to units configured to process at least one function or operation, and may be implemented as hardware, software, or a combination of hardware and software.

Referring to FIG. 2, the base station includes a wireless communication portion 210, a backhaul communication portion 220, a storage portion 230, and a controller (or a processor) 240.

The wireless communication portion 210 performs functions for transmitting/receiving signals through a radio channel. For example, the wireless communication portion 210 performs a function for conversion between a baseband signal and a bit string according to the physical layer specification of the system. For example, during data transmission, the wireless communication portion 210 encodes and modulates a transmitted bit string, thereby generating complex symbols. In addition, during data reception, the wireless communication portion 210 demodulates and decodes a baseband signal, thereby restoring a received bit string.

In addition, the wireless communication portion 210 up-converts a baseband signal into a radio frequency (RF) band signal, transmits the same through an antenna, and down-converts an RF band signal received through the antenna into a baseband signal. To this end, the wireless communication portion 210 may include a transmission filter, a reception filter, an amplifier, a mixer, an oscillator, a digital-to-analog (DAC) converter, an analog-to-digital (ADC) converter, and the like. In addition, the wireless communication portion 210 may include multiple transmission/reception paths. Furthermore, the wireless communication portion 210 may include at least one antenna array including multiple antenna elements.

In terms of hardware, the wireless communication portion 210 may include a digital unit and an analog unit. The analog unit may include multiple sub-units according to the operating power, operating frequency, and the like. The digital unit may be implemented as at least one processor (for example, digital signal processor (DSP)).

The wireless communication portion 210 transmits and receives signal as described above. Accordingly, all or part of the wireless communication portion 210 may be referred to as "transmitter", "receiver", or "transceiver". In addition, transmission and reception performed through a radio channel, as will be described hereinafter, will be used in a sense including the above-described processing performed by the wireless communication portion 210.

The backhaul communication portion 220 provides an interface for performing communication with other nodes inside the network. That is, the backhaul communication portion 220 convert bit strings transmitted from the base station to other nodes, for example, other access nodes, other base stations, upper-level nodes, core networks, and the like, and converts physical signals received from other nodes into bit strings.

The storage portion 230 stores data such as default programs for operations of the base station, application programs, configuration information, and the like. The storage portion 230 may be configured as a volatile memory, a nonvolatile memory, or a combination of a volatile memory and a nonvolatile memory. The storage portion 230 also provides stored data at the request of the controller 240.

The controller 240 controls overall operations of the base station. For example, the controller 240 transmits and receives signals through the wireless communication portion 210 or the backhaul communication portion 220. In addition, the controller 240 records data in the storage portion 230 and reads the same. The controller 240 may also perform functions of a protocol stack required by communication specifications. According to another example of implementation, the protocol stack may be included in the wireless communication portion 210. To this end, the controller 240 may include at least one processor.

According to various embodiments, the controller 240 may control the base station so as to perform operations according to various embodiments described later.

Figure 3:
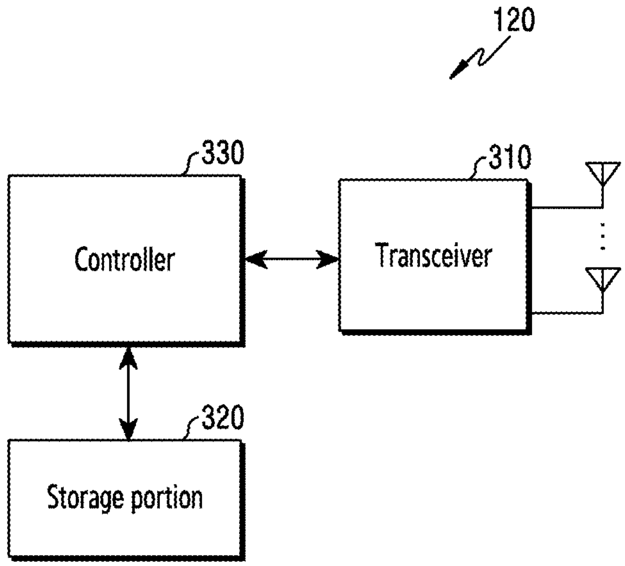
FIG. 3 illustrates a configuration of a terminal in a wireless communication system according to various embodiments of the present disclosure.

FIG. 3 illustrates a configuration of a terminal in a wireless communication system according to various embodiments of the present disclosure. The exemplary configuration illustrated in FIG. 3 may be understood as the configuration of the terminal 120. As used herein, terms such as "portion" and "-er" refer to units configured to process at least one function or operation, and may be implemented as hardware, software, or a combination of hardware and software.

Referring to FIG. 3, the terminal includes a communication portion 310, a storage portion 320, and a controller (or a processor) 330.

The communication portion 310 performs functions for transmitting/receiving signals through a radio channel. For example, the communication portion 310 performs a function for conversion between a baseband signal and a bit string according to the physical layer specification of the system. For example, during data transmission, the communication portion 310 encodes and modulates a transmitted bit string, thereby generating complex symbols. In addition, during data reception, the communication portion 310 demodulates and decodes a baseband signal, thereby restoring a received bit string. In addition, the communication portion 310 up-converts a baseband signal into an RF band signal, transmits the same through an antenna, and down-converts an RF band signal received through the antenna into a baseband signal. For example, the communication portion 310 may include a transmission filter, a reception filter, an amplifier, a mixer, an oscillator, a DAC, an ADC, and the like.

In addition, the communication portion 310 may include multiple transmission/reception paths. Furthermore, the communication portion 310 may include at least one antenna array including multiple antenna elements. In terms of hardware, the communication portion 310 may include a digital circuit and an analog circuit (for example, a radio frequency integrated circuit (RFIC)). The digital circuit and the analog circuit may be implemented as a single package. In addition, the communication portion 310 may include multiple RF chains. Furthermore, the communication portion 310 may perform beamforming.

The communication portion 310 transmits and receives signal as described above. Accordingly, all or part of the communication portion 310 may be referred to as "transmitter", "receiver", or "transceiver". In addition, transmission and reception performed through a radio channel, as will be described hereinafter, will be used in a sense including the above-described processing performed by the communication portion 310.

The storage portion 320 stores data such as default programs for operations of the terminal, application programs, configuration information, and the like. The storage portion 320 may be configured as a volatile memory, a nonvolatile memory, or a combination of a volatile memory and a nonvolatile memory. The storage portion 320 also provides stored data at the request of the controller 330.

The controller 330 controls overall operations of the terminal. For example, the controller 330 transmits and received signals through the communication portion 310. In addition, the controller 330 records data in the storage portion 320 and reads the same. The controller 330 may also perform functions of a protocol stack required by communication specifications. To this end, the controller 330 may include at least one processor or microprocessor, or may be a part of the processor. In addition, a part of the communication portion 310 and the controller 330 may be referred to as a communication processor (CP).

According to various embodiments, the controller 330 may control the terminal so as to perform operations according to various embodiments described later.

As will be used in the following description, terms for identifying access nodes, terms denoting network entities, terms denoting messages, terms denoting interfaces between network entities, terms denoting various pieces of identification information, and the like are examples provided for convenience of description. Therefore, the present disclosure is not limited to the terms described later, and other terms denoting objects having equivalent technical meanings may be used.

Figure 4:
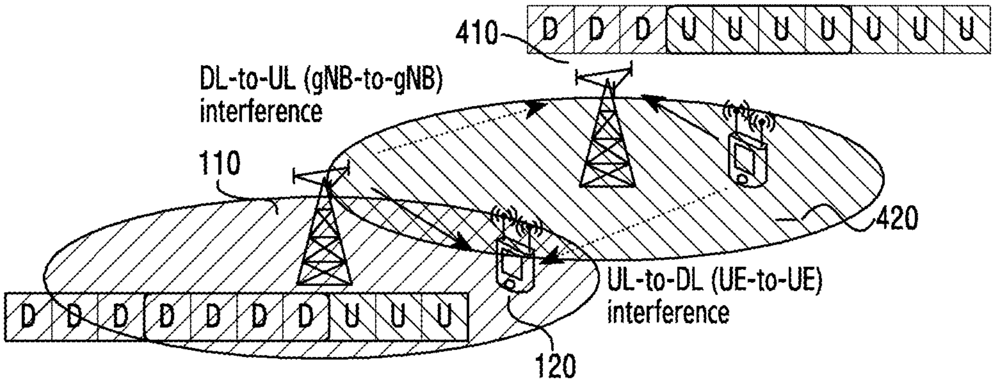
FIG. 4 illustrates a type of crosslink interference (CLI) related to various embodiments of the present disclosure.

FIG. 4 illustrates a type of crosslink interference (CLI) related to various embodiments of the present disclosure.

Referring to FIG. 4, the manner in which CLI occurs between terminals or between a terminal and a base station may be described. For example, UL-to-DL interference may correspond to interference occurring, when a base station 110 transmits a downlink signal to a terminal 120, due to an uplink signal from a terminal 420 positioned in a cell adjacent to the cell in which the terminal 120 is positioned, and may be referred to as UE-to-UE interference. That is, interference occurring in a slot through which the terminal 120 is scheduled to receive a downlink signal due to an uplink signal from the terminal 420 in the adjacent cell may degrade the quality of the downlink signal received from the base station 110.

As another example, DL-to-UL interference may correspond to interface occurring, when a terminal 420 transmits an uplink signal to a base station 410, due to a downlink signal transmitted by a base station 110 in a cell adjacent to the cell in which the terminal 420 is positioned, and may be referred to as gNB-to-gNB interference. That is, interference occurring in a slot through which the terminal 420 is scheduled to transmit an uplink signal due to a downlink signal from the base station 110 in the adjacent cell may degrade the quality of the uplink signal received from the terminal 110.

In the present disclosure, a detailed method in which, if the above-mentioned UE-to-UE interference occurs, the terminal 120 measures interference caused by the terminal 420 in the adjacent cell may be described. Hereinafter, the terminal (or UE) may refer to a terminal 120 which receives an interference signal. In addition, in the present disclosure, a terminal which receives an interference signal may be referred to as a victim terminal, and a base station of a cell in which a victim terminal is positioned may be referred to as a victim base station. Furthermore, in the present disclosure, a terminal which transmits an interference signal may be referred to as an aggressor terminal, and a base station of a cell in which an aggressor terminal is positioned may be referred to as an aggressor base station.

Figure 5:
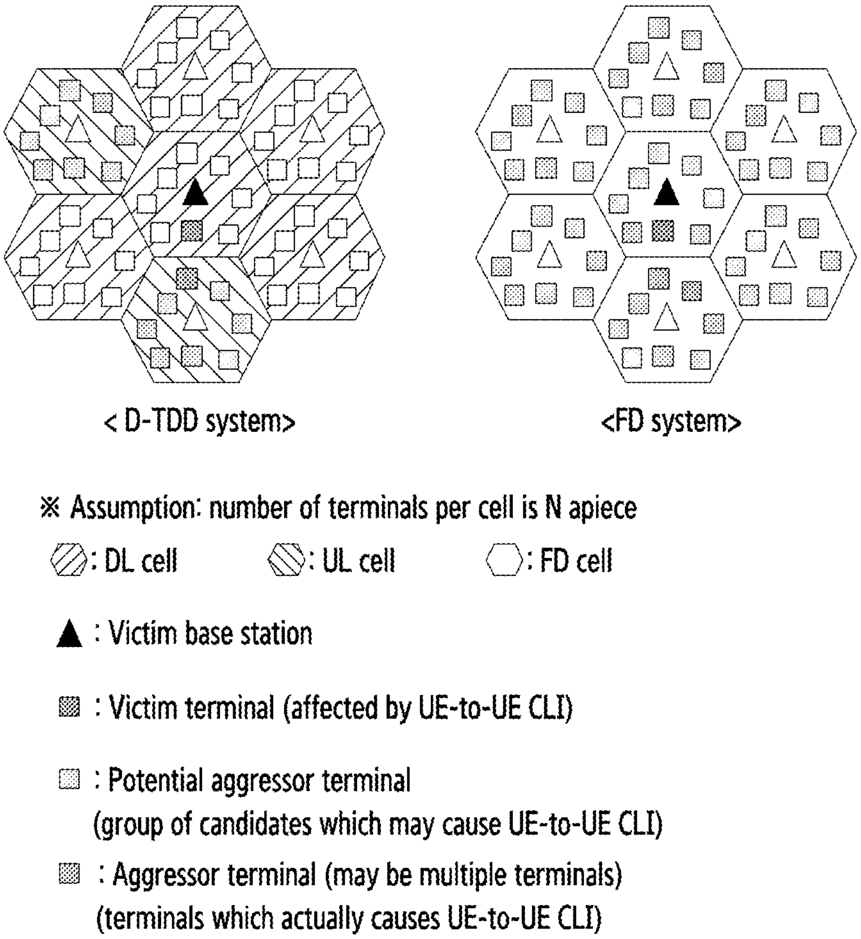
FIG. 5 illustrates a type of UE-to-UE CLI related to various embodiments of the present disclosure.

FIG. 5 illustrates a type of UE-to-UE CLI related to various embodiments of the present disclosure.

Referring to FIG. 5, the number of times terminals measure UE-to-UE CLI in a dynamic-time division duplex (D-TDD) system and in a full duplex (FD) system may be compared. In the D-TDD system, UE-to-UE CLI may occur in a cell having different downlink and uplink configurations. For example, if downlink transmission is scheduled for terminals in a cell in which a victim base station and a victim terminal are positioned, some of potential aggressor terminals positioned in two cells for which uplink transmission is scheduled, among adjacent cells, may cause interference in the victim terminal. Therefore, assuming that N terminals are positioned in each cell, a maximum of 2N times of CLI measurement may be necessary for the victim terminal to verify (or detect, identify, select) the aggressor terminal(s) which transmits an interference signal.

In contrast, UE-to-UE CLI may occur by means of all adjacent cells in the FD system. For example, if six cells are adjacent to a cell in which a victim terminal is positioned, all terminals positioned in all adjacent cells may be potential aggressor terminals. Therefore, assuming that N terminals are positioned in each cell, a maximum of 6N times of CLI measurement may be necessary for the victim terminal to verify (or detect, identify, select) the aggressor terminal(s) which positioned in adjacent cells. In addition, unlike the D-TDD system, other terminals positioned in the cell in which the victim terminal is positioned may be a potential aggressor terminal, and the victim terminal may thus need to measure CLI with regard to other terminals in the cell. Therefore, in the FD system, the victim terminal may need to perform a maximum of (7N−1) times of CLI measurement.

Resources for measuring UE-to-UE CLI may thus be wasted in the FD system because of the excessive number of times of CLI measurement compared with the D-TDD system. Therefore, a method for enabling a victim terminal to efficiently measuring UE-to-UE CLI in an FD system may be described in the present disclosure.

Figure 6:
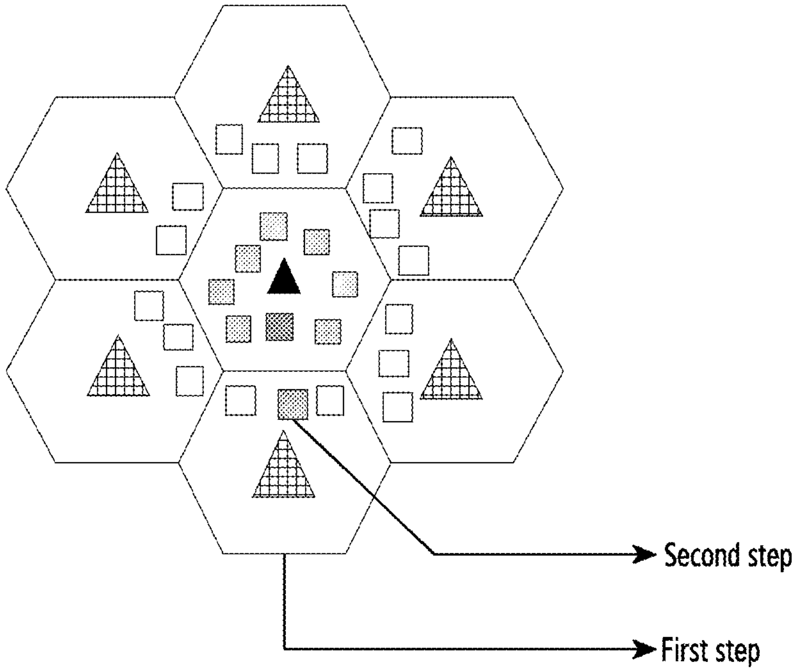
FIG. 6 illustrates a CLI measurement step according to various embodiments of the present disclosure.

FIG. 6 illustrates a CLI measurement step according to various embodiments of the present disclosure.

Referring to FIG. 6, a terminal may perform two separate steps (for example, first and second steps) of CLI measurement for the sake of efficient UE-to-UE CLI measurement. The first step may refer to an inter-cell CLI measurement operation, and the second step may refer to an intra-cell CLI measurement operation. In addition, the second step described in the present disclosure may be optionally performed by a victim terminal according to the communication environment (for example, if no adjacent cell is verified as an aggressor cell in the first step, or if no up/downlink transmission resource is allocated to an adjacent cell verified as an aggressor cell).

Particularly, the first step may refer to a step in which aggressor cells including aggressor base stations are determined as aggressor cells through cell-unit CLI measurement (that is, cell-level CLI measurement). Therefore, in the first step, cell-level CLI measurement may be performed as many times as the number of adjacent cells excluding the cell to which a victim base station and a victim terminal belong. The second step may refer to a step in which aggressor terminal(s) are specified by measuring the CLI of intra-cell terminals or terminals in aggressor cell(s) (that is, UE-level CLI measurement). In the second step, when measuring the CLI regarding intra-cell terminals, the UE-level CLI measurement may be performed with regard to intra-cell terminals excluding the victim cell. Therefore, the number of times CLI is measured in the second step may be N−1 or 2N−1 (for example, if no inter-cell CLI exists, and if intra-cell CLI solely exists). Therefore, the two-step inter-cell CLI measurement according to the present disclosure is advantageous in that, compared with a method in which the CLI is measured with regard to all terminals in adjacent cells, the number of times of measurement is reduced by N+5/7N−1 (for example, 78% if N=10, 85% if N=∞) or 2N+5/7N−1 (for example, 64% if N=10, 73% of N=∞).

Figure 7:
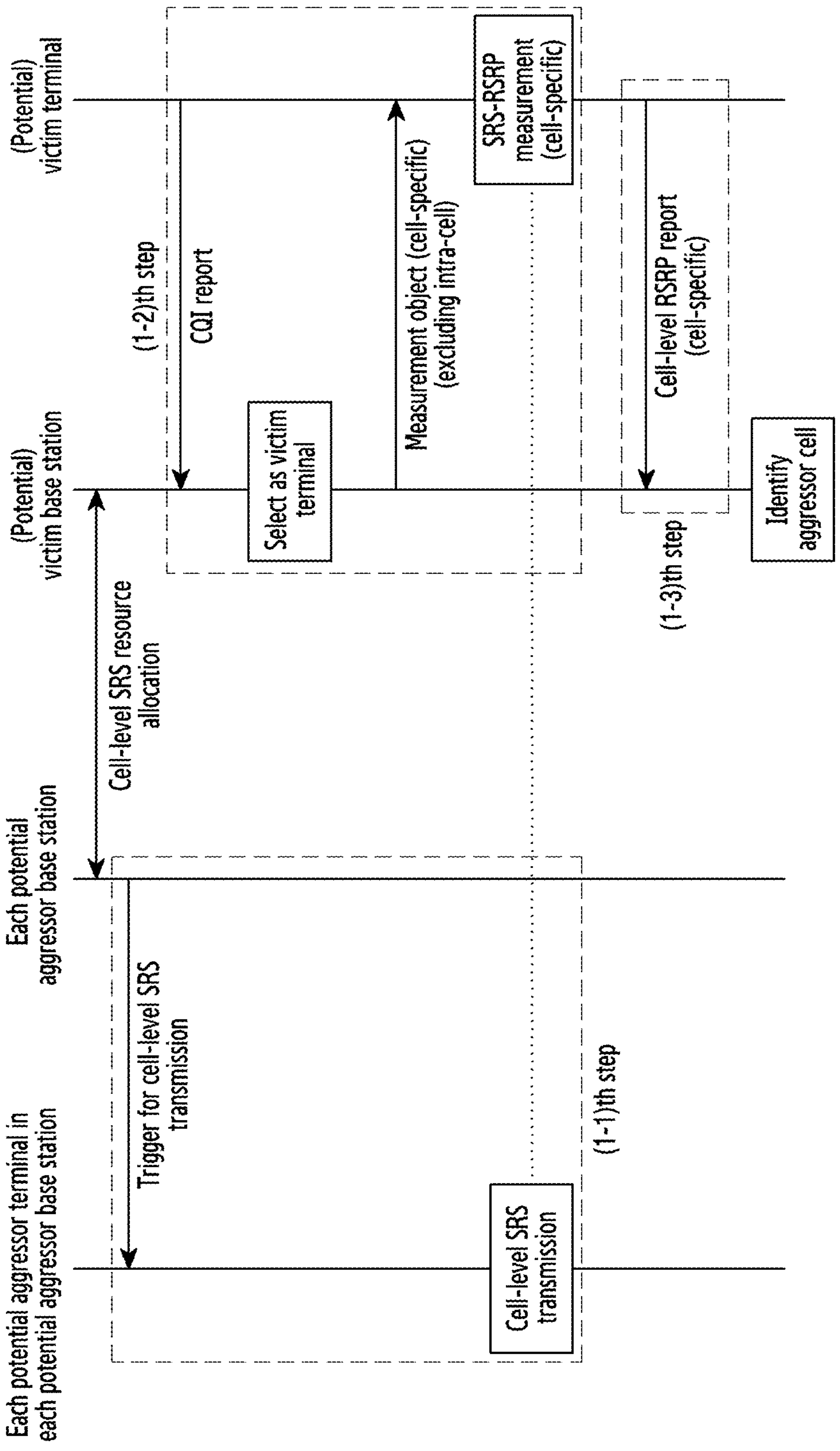
FIG. 7 illustrates a cell-level CLI measurement method according to various embodiments of the present disclosure.

FIG. 7 illustrates a cell-level CLI measurement method according to various embodiments of the present disclosure.

Referring to FIG. 7, a flow of operations between base stations and terminals positioned in a first cell (for example, a cell in which a potential victim base station and a potential victim terminal are positioned) and adjacent cells (for example, cells in which a potential aggressor base station and a potential aggressor terminal(s) are positioned). A base station positioned in the first cell (for example, a potential victim base station) may share a cell-level sounding reference signal (SRS) resource configuration with base stations in adjacent cells (for example, potential aggressor base stations), and may predetermine the cell-level SRS resource through a coordinate process with base stations of adjacent cells. The SRS for detecting the channel state is only an example of a reference signal (RS), and another RS may be used. For example, a CLI measurement RS may be used. The CLI measurement RS may be an RS designed for UE-to-UE CLI measurement. The CLI measurement RS may be a signal for informing a terminal which transmits the RS that the RS will be transmitted in a specific position on a resource grid based on a resource configuration of a base station. In addition, the CLI measurement RS may be a signal for informing a terminal which transmits the RS of a sequence used to transmit the RS, based on a resource configuration of a base station.

The cell-level SRS resource configuration shared between base stations will be described later in detail with reference to FIG. 9.

In the (1-1)th step, each potential aggressor base station may trigger cell-level SRS transmission from potential aggressor terminals positioned in the corresponding cell, based on cell-level SRS resource configuration information shared with the base station of the first cell. If cell-level SRS transmission is triggered by a potential aggressor base station, potential aggressor terminals may transmit a cell-level SRS to a victim terminal. In this case, potential aggressor terminals positioned in respective adjacent cells may transmit the same sequence through the same time and frequency resources with regard to each cell, thereby transmitting a cell-level SRS. However, potential aggressor terminals positioned in different cells may transmit the same sequence through difference resources or may transmit different sequences through the same resource.

In the (1-2)th step, a terminal positioned in the first cell may transmit a channel status information (CIS) report to the base station of the first cell. The CSI report transmitted by the terminal may include feedback information regarding the CSI-RS transmitted from the base station of the first cell to the terminal (for example, precoding matrix indicator (PMI), channel quality information (CQI), rank indicator RI), CSI-RS resource indicator (CRI), received signal strength indicator (RSSI), and/or layer indicator (LI)). The base station of the first cell may select (or choose) the terminal as a victim terminal, based on feedback information included in the CSI report received from the terminal. For example, if the CQI value included in the CSI report is equal to/less than a specific threshold, the base station of the first cell may consider that interference occurs in the terminal, and may determine that the terminal deemed to have interference occurring therein is a victim terminal. As another example, if the RSSI is equal to/less than a specific threshold, the base station of the first cell may consider that interference occurs in the terminal, and may determine that the terminal deemed to have interference occurring therein is a victim terminal. In addition, if the CQI value of RSSI of multiple terminals is equal to/less than a specific threshold, the base station of the first cell determine that the corresponding terminals are victim terminals. Therefore, a victim terminal may refer to one of multiple terminals deemed to be victim terminals, and the number of victim terminals is not necessarily limited to one.

If a terminal of the first cell is determined as a victim terminal, the base station of the first cell may be determined as a victim base station. The specific threshold may be a predetermined value, and may be configured differently depending on the communication environment (for example, line of sight (LOS) or non-LOS (NLOS) environment). The victim base station may transmit information regarding a measurement object to the terminal selected (or determined) as a victim terminal through upper-layer signaling (for example, resource radio control (RRC) message). The information regarding a measurement object may include different pieces of information with regard to respective adjacent cells, and may include cell-level SRS resources to be transmitted by potential aggressor terminals positioned in respective adjacent cells. In addition, by transmitting the information regarding a measurement object, the victim base station may trigger measurement of reference signal received power (RSRP) regarding the cell-level SRS by the victim terminal. For example, the victim base station may transmit information regarding a measurement object to the victim terminal, thereby instructing the victim terminal to measure the RSRP regarding the cell-level SRS received from potential aggressor terminals positioned in respective adjacent cells. The victim terminal may measure the RSRP regarding the cell-level SRS received from potential aggressor terminals positioned in respective adjacent cells. Since the cell-level SRS transmitted in each adjacent cell has a different transmission resource and a different sequence, the victim terminal may measure the cell-level RSRP with regard to each cell.

In the (1-3)th step, the victim terminal may transmit a cell-level RSRP report resulting from cell-specific measurement to the victim base station. The cell-level RSRP report may include RSRP measurement values of cell-level SRSs with regard to respective adjacent cells, used by the victim base station to determine an aggressor cell among adjacent cells. In an embodiment, the victim terminal may report a pair of an RSRP measurement value and a resource ID (for example, the ID of a resource used to transmit a cell-level SRS with regard to each cell) regarding a cell-level SRS to the victim base station. In an embodiment, the victim terminal may sort resource IDs in descending order of the RSRP measurement value regarding a cell-level SRS and may report resource IDs to the victim base station. In an embodiment, the victim terminal may select N (for example, N is an integer equal to/larger than 1) resource IDs in descending order of the RSRP measurement value regarding a cell-level SRS and may report N pairs of resource IDs and RSRP measurement values regarding the cell-level SRS to the victim base station. In an embodiment, the victim terminal may report a pair of a resource ID and an RSRP measurement value regarding a cell-level SRS to the victim base station, the RSRP measurement value regarding the cell-level SRS being equal to/larger than a specific threshold. In an embodiment, the victim terminal may report a resource ID corresponding to an RSRP measurement value regarding a cell-level SRS to the victim base station, the RSRP measurement value regarding the cell-level SRS being equal to/larger than a specific threshold.

The cell-level RSRP report may further include an index (for example, an RSRP measurement value regarding a maximum cell-level SRS or a threshold) used by the victim base station to determine an aggressor cell. For example, upon receiving the cell-level RSRP report, the victim base station may identify (or verify) that the corresponding adjacent cell is an aggressor cell if the RSRP measurement value regarding a cell-level SRS is equal to/larger than a specific threshold. Alternatively, upon receiving the cell-level RSRP report, the victim base station may (or verify) that the cell having the largest RSRP measurement value regarding a cell-level SRS is an aggressor cell. The cell-level RSRP report may be transmitted from the victim terminal to the victim base station through upper-level signaling (for example, RRC message). The cell-level RSRP report may be transmitted through a physical layer between the victim base station and the victim terminal. Since the FD system has a higher degree of terminal scheduling flexibility than the D-TDD system, the UE-to-UE CLI may have a larger degree of change than the D-TDD system. Therefore, in the FD system, the method of cell-level RSRP reporting through a physical layer may be advantageous for scoping with a dynamic CLI change compared with the method of reporting through upper-layer signaling.

Figure 8:
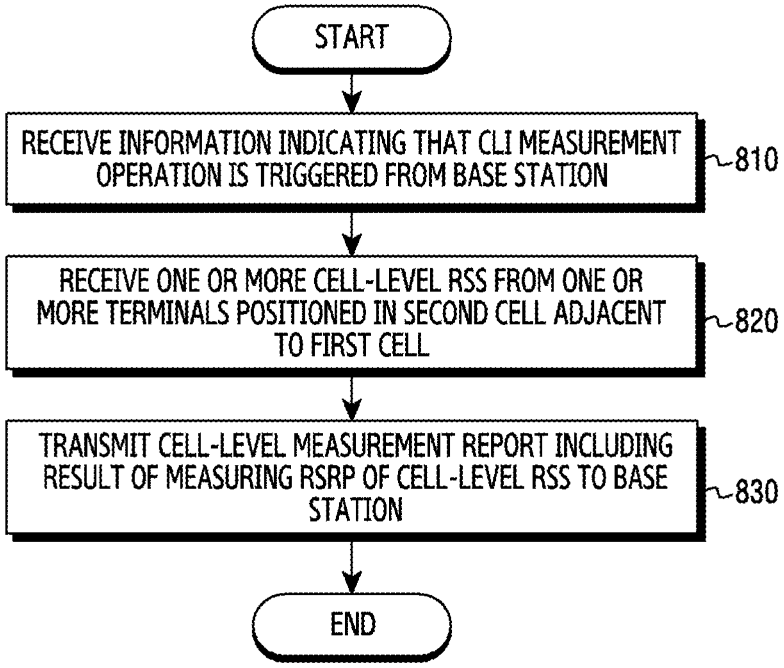
FIG. 8 illustrates an order of cell-level CLI measurement according to various embodiments of the present disclosure.

FIG. 8 illustrates an order of cell-level CLI measurement according to various embodiments of the present disclosure.

Referring to FIG. 8, operations of a terminal selected as a victim terminal by a base station (for example, a victim base station) in the cell-level CLI measurement procedure in FIG. 7 may be described. Hereinafter, descriptions that overlap those in FIG. 7 may be omitted, and descriptions made with reference to FIG. 7 are applicable to time-sequential operations in FIG. 8.

In step 810, a victim terminal may receive information indicating that a CLI measurement operation is triggered, from a base station. The victim terminal may receive information regarding a measurement object from the victim base station, and may initiate a CLI measurement operation by receiving the information regarding a measurement object.

In step 820, the victim terminal may receive one or more cell-level SRSs from one or more aggressor terminals (for example, potential aggressor terminals) positioned in a second cell adjacent to a first cell (for example, one of multiple cells adjacent to the first cell). The one or more cell-level SRSs transmitted from one or more potential aggressor terminals positioned in the second cell may be transmitted through the same time and frequency resources according to cell-level resource configuration information included in the information regarding a measurement object, and may have the same sequence.

In step 830, the victim terminal may measure the RSRP regarding cell-level SRSs received from one or more potential aggressor terminals positioned in the second cell, and may transmit a cell-level RSRP report including the measurement result to the base station.

Figure 9:
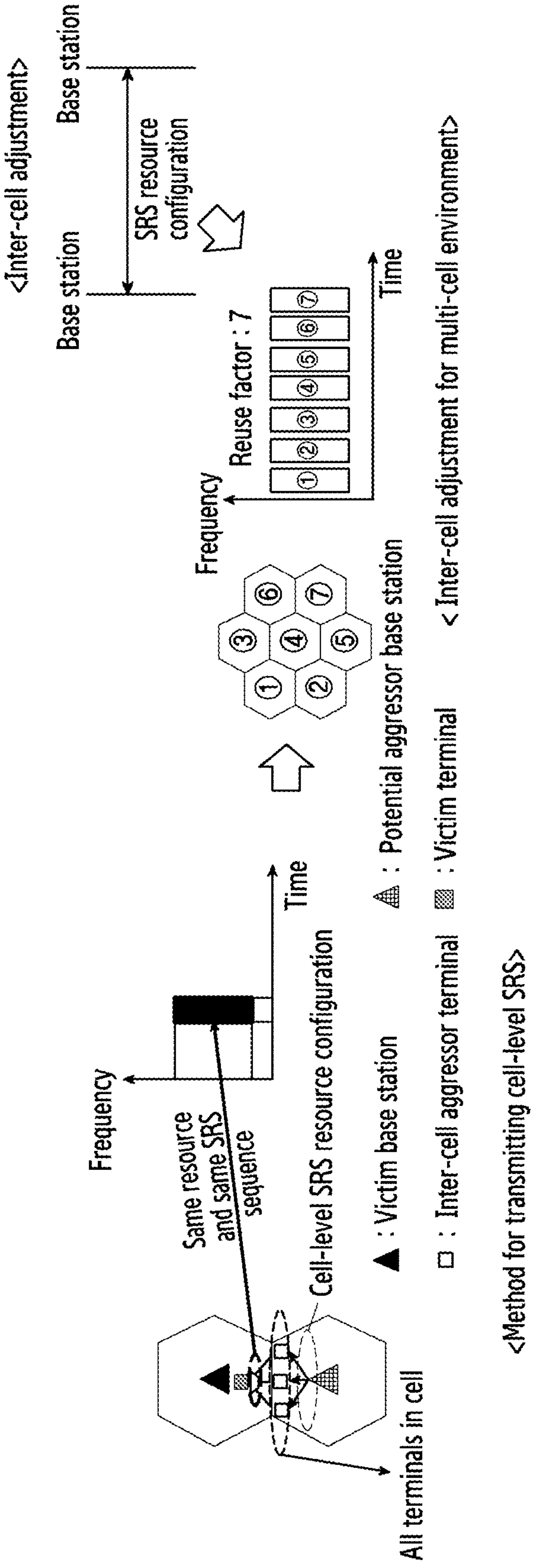
FIG. 9 illustrates a cell-level sounding reference signal (SRS) transmission method according to various embodiments of the present disclosure.

FIG. 9 illustrates a cell-level SRS transmission method according to various embodiments of the present disclosure.

Referring to FIG. 9, a resource configuration method for enabling potential aggressor terminals to transmit a cell-level SRS to a victim terminal may be described. All terminals positioned in cells adjacent to a cell in which a victim terminal is positioned may transmit the same sequence through the same time and frequency resources with regard to each cell, thereby conducting a cell-level SRS transmission process. As used herein, the same sequence may also mean the same initial value of sequence generation for an SRS. Therefore, in order to transmit a cell-level SRS with regard to each adjacent cell, different cell-level SRS resources may be configured with regard to respective cells. In order to configure different cell-level SRS resources with regard to respective cells, a potential aggressor base station may exchange cell-specific SRS resource configuration information with potential aggressor base stations in adjacent cells, thereby performing an inter-cell negotiation process.

In an embodiment, a potential aggressor base station may allocate different cell-level SRS resources to respective adjacent cells. Particularly, a potential aggressor base station may configure cell-level SRS resource configuration information for potential aggressor base stations in adjacent cells through upper-layer signaling (for example, RRC message). A potential aggressor base station may configure cell-level SRS resource configuration information in a dynamic method or a non-dynamic method.

According to the dynamic cell-level SRS resource configuration method, every time potential aggressor base stations transmit a cell-level SRS, the potential aggressor base station may configure cell-level SRS resource configuration information for the potential aggressor base stations through inter-cell adjustment. A detailed method thereof will be described later with reference to FIG. 11. According to the non-dynamic cell-level SRS resource configuration method, the potential aggressor base station may configure cell-level SRS resource configuration information for potential aggressor base stations through initial inter-cell adjustment, and potential aggressor base stations in respective adjacent cells may transmit a cell-level SRS to a victim terminal through resources configured with regard to respective adjacent cells. A detailed method thereof will be described later with reference to FIG. 12. Meanwhile, the non-dynamic cell-level SRS resource configuration method may be more efficient in terms of inter-cell signaling overhead than the dynamic cell-level SRS resource configuration method.

The number of cell-level SRS resources configured for adjacent cells may be identical to the number of adjacent cells, and the frequency resource reuse factor may be identical to the number of adjacent cells. The cell-level SRS resource configuration information may include information regarding at least one of resource identification (ID), starting resource block (RB), RB length, comb factor (for example, factor for multiplexing multiple SRSs), slot/symbol index, sequence ID, period, or power. The resource ID may be configured differently with regard to respective adjacent cells. By exchanging cell-specific SRS resource configuration information between a potential victim base station and potential aggressor base stations in adjacent cells, a potential aggressor base stations in each adjacent cell may allocate the same cell-level SRS resource to potential aggressor terminals positioned in the corresponding cell. In addition, the cell-level SRS resource configuration information may further include a flag for distinction from a UE-level SRS resource (for example, a flag value of 0 indicates a cell-level SRS resource).

Figure 10:
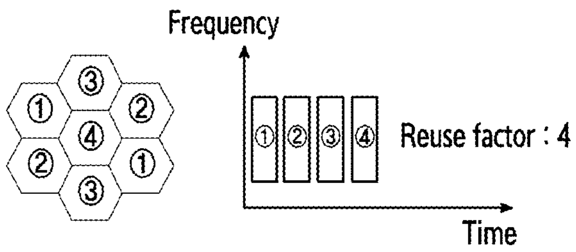
FIG. 10 illustrates a cell-level SRS transmission method according to various embodiments of the present disclosure.

FIG. 10 illustrates a cell-level SRS transmission method according to various embodiments of the present disclosure.

Referring to FIG. 10, a method for enabling a potential victim base station to configure different pieces of cell-level SRS resource information for respective cells with potential aggressor base stations in adjacent cells. The potential victim base station may exchange cell-level SRS resource configuration information with potential aggressor base stations in adjacent cells, and the same cell-level SRS resource may be allocated to potential aggressor terminals positioned in the same adjacent cell through the cell-level SRS resource configuration information. Descriptions overlapping those made with reference to FIG. 9 may be omitted herein.

However, unlike the cell-level SRS resource configuration method in FIG. 9, the potential victim base station may configure adjacent cells as groups, and an adjacent cell group may hereinafter be understood as, in a logical sense, including one or more adjacent cells. Therefore, the potential victim base station may configure cell-level SRS resource configuration information with regard to each adjacent cell group including one or multiple adjacent cells. For example, assuming that six adjacent cells are configured as adjacent cell groups including two adjacent cells, potential aggressor terminals positioned in respective cell groups may transmit the same sequence to a victim terminal through the same time and frequency resources. In addition, assuming that two adjacent cells constitute an adjacent cell group, the frequency resource reuse factor may be identical to the number of adjacent cell groups.

Figure 11:
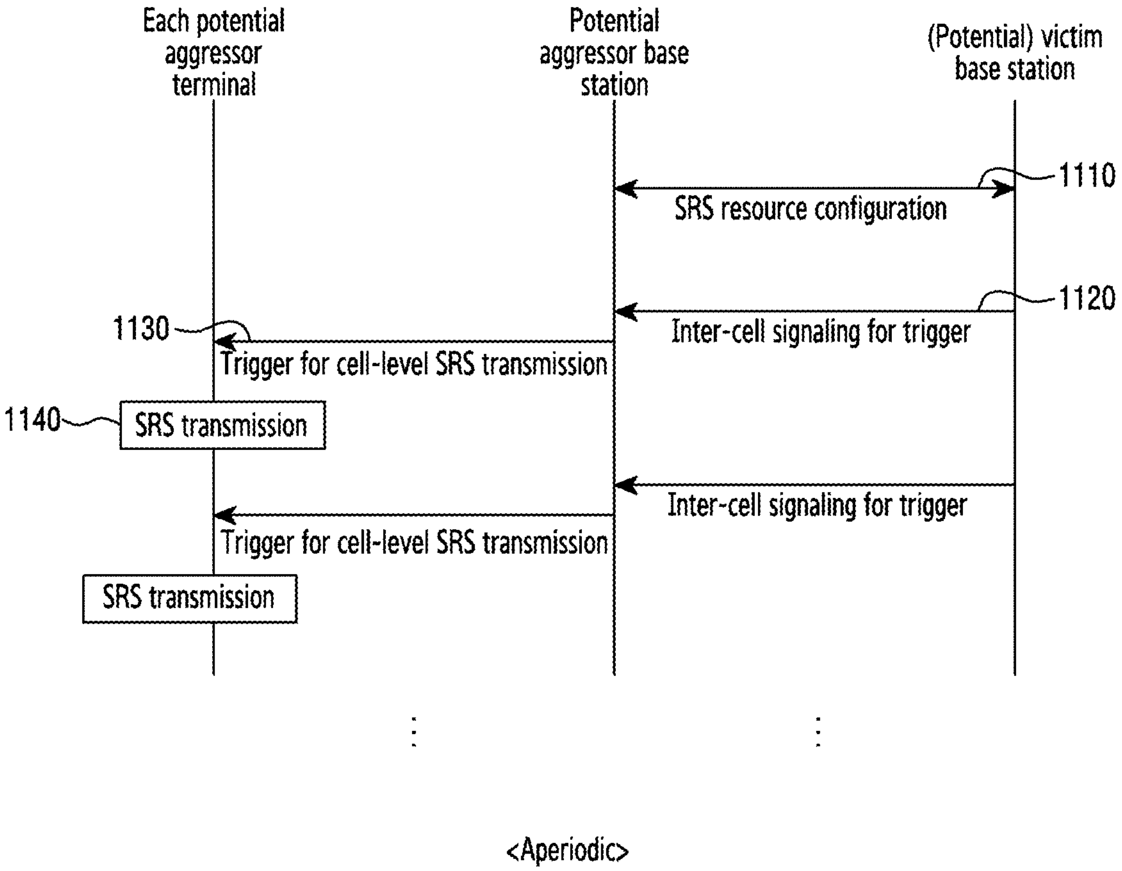
FIG. 11 illustrates a cell-level SRS transmission method according to various embodiments of the present disclosure.

FIG. 11 illustrates a cell-level SRS transmission method according to various embodiments of the present disclosure.

Referring to FIG. 11, a method for triggering transmission of a cell-level SRS from respective potential aggressor terminals to a victim terminal in an aperiodic (or dynamic) manner may be described.

In step 1110, cell-level SRS resource configuration information may be configured for potential aggressor terminals by exchanging cell-level SRS resource configuration information between a potential victim base station and potential aggressor base stations.

In step 1120, the potential victim base station may instruct a potential aggressor base station to trigger transmission of a cell-level SRS from potential aggressor terminals through inter-cell signaling (for example, RRC message).

In step 1130, the potential victim base station may trigger transmission of a cell-level SRS from potential aggressor terminals positioned in the corresponding cell. For example, the potential victim base station may transmit a control message (for example, downlink control information (DCI)) instructing cell-level SRS transmission to each potential aggressor terminal through a control channel (for example, a physical downlink control channel (PDCCH)).

In step 1140, after receiving a message instructing cell-level SRS transmission from the potential aggressor base station, each potential aggressor terminal may transmit a cell-level SRS to the victim terminal through a cell-level SERS resource allocated with regard to each cell.

After each potential aggressor terminal transmits a cell-level SRS to the victim terminal, the above-described steps 1120 to 1140 may be repeated such that each potential aggressor terminal transmits a cell-level SRS to the victim terminal. That is, every time there is a need to measure the RSRP regarding a cell-level SRS in order to determine a victim terminal, the potential victim base station may perform an inter-cell signaling operation (for example, step 1120) with a potential aggressor base station.

Figure 12:
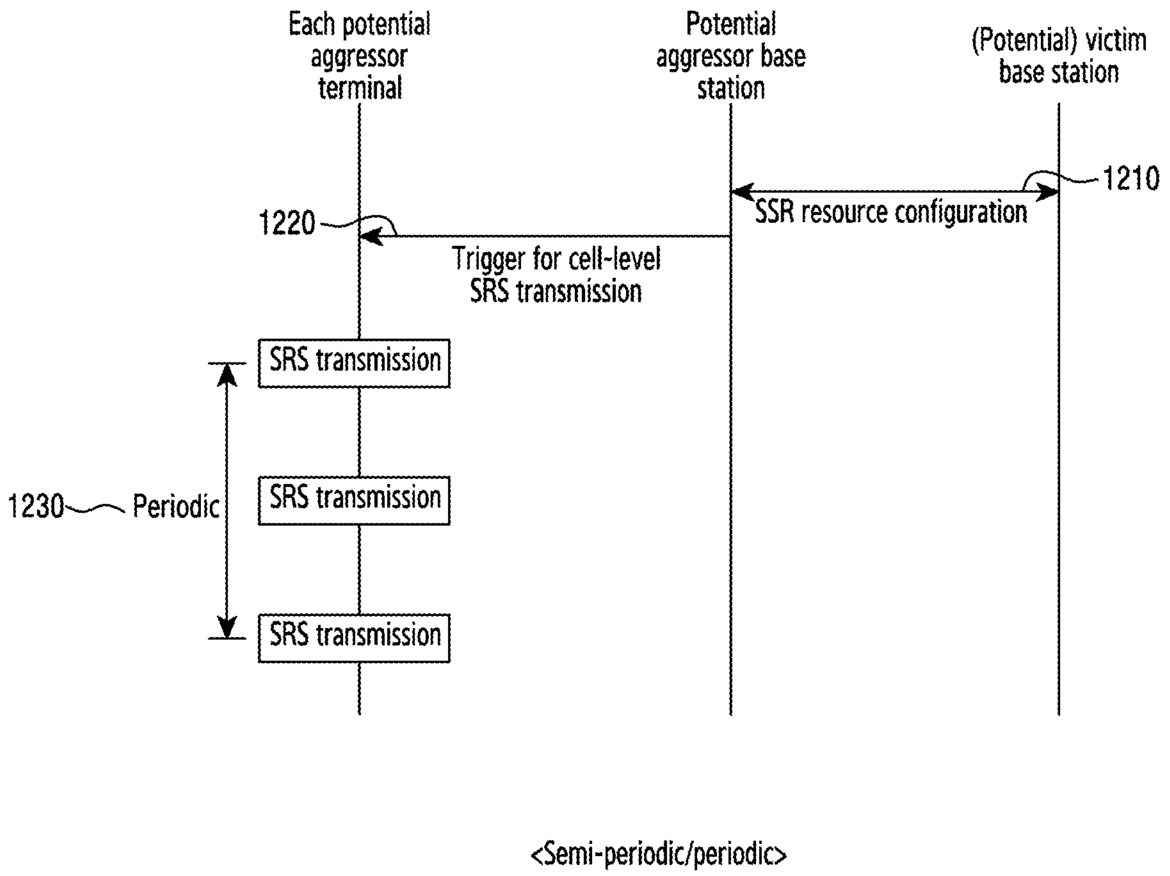
FIG. 12 illustrates a cell-level SRS transmission method according to various embodiments of the present disclosure.

FIG. 12 illustrates a cell-level SRS transmission method according to various embodiments of the present disclosure.

Referring to FIG. 12, a method for triggering transmission of a cell-level SRS from respective potential aggressor terminals to a victim terminal in a periodic or semi-periodic (or non-dynamic) manner may be described.

In step 1210, cell-level SRS resource configuration information may be configured for potential aggressor base stations by exchanging cell-level SRS resource configuration information between a potential victim base station and potential aggressor base stations. The cell-level SRS resource configuration information may further include information regarding a cell-level SRS transmission period.

In step 1220, the potential aggressor base station may trigger transmission of a cell-level SRS from potential aggressor terminals positioned in the corresponding cell. For example, the potential aggressor base station may transmit configuration information related to cell-level SRS transmission to each potential aggressor terminal through an RRC message, thereby triggering cell-level SRS transmission (that is, periodic trigger type). Alternatively, the potential aggressor base station may transmit configuration information related to cell-level SRS transmission to each potential aggressor terminal through a medium access control (MAC) control element (CE), thereby triggering cell-level SRS transmission (that is, semi-periodic trigger type).

In step 1230, after receiving a message instructing cell-level SRS transmission from the potential aggressor base station, each potential aggressor terminal may transmit a cell-level SRS to the victim terminal through a cell-level SERS resource allocated with regard to each cell. Each potential aggressor terminal may periodically transmit a cell-level SRS to the victim terminal according to a cell-level SRS transmission period included in the cell-level SERS resource configuration information. Therefore, the potential victim base station may trigger cell-level SRS transmission without separate inter-cell signaling.

Figure 13:
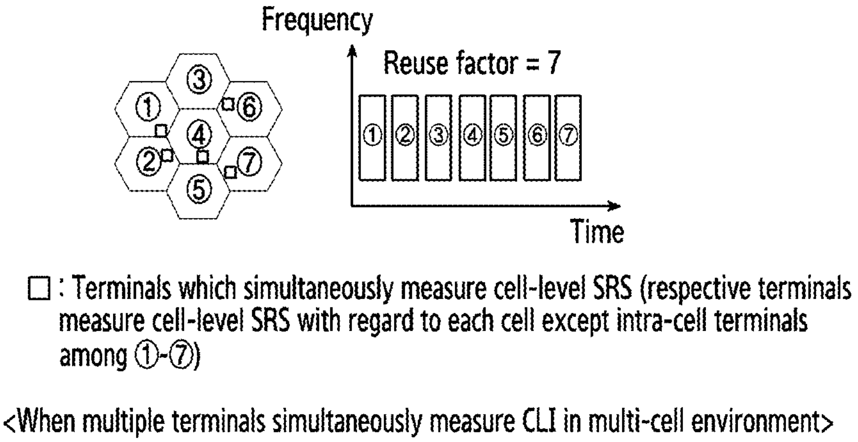
FIG. 13 illustrates a cell-level SRS transmission method according to various embodiments of the present disclosure.

FIG. 13 illustrates a cell-level SRS transmission method according to various embodiments of the present disclosure.

Referring to FIG. 13, a cell-level SRS resource configuration method for enabling potential victim terminals positioned in adjacent cells to simultaneously measure CLI in a multi-cell environment may be described. Depending on the viewpoint, a potential victim terminal may also be a potential aggressor terminal from the standpoint of a potential aggressor terminal positioned in an adjacent cell. Therefore, potential aggressor terminals may simultaneously receive a cell-level SRS for the sake of CLI measurement. Respective potential victim terminals may thus receive cell-level SRSs from terminals positioned in other adjacent cells through resources allocated based on cell-level SRS resource configuration information. In the case of a resource allocated to terminals positioned in a specific cell (for example, second cell), the terminals in the specific cell (for example, second cell) may transmit no cell-level SRS for inter-cell CLI measurement.

Figure 14A:
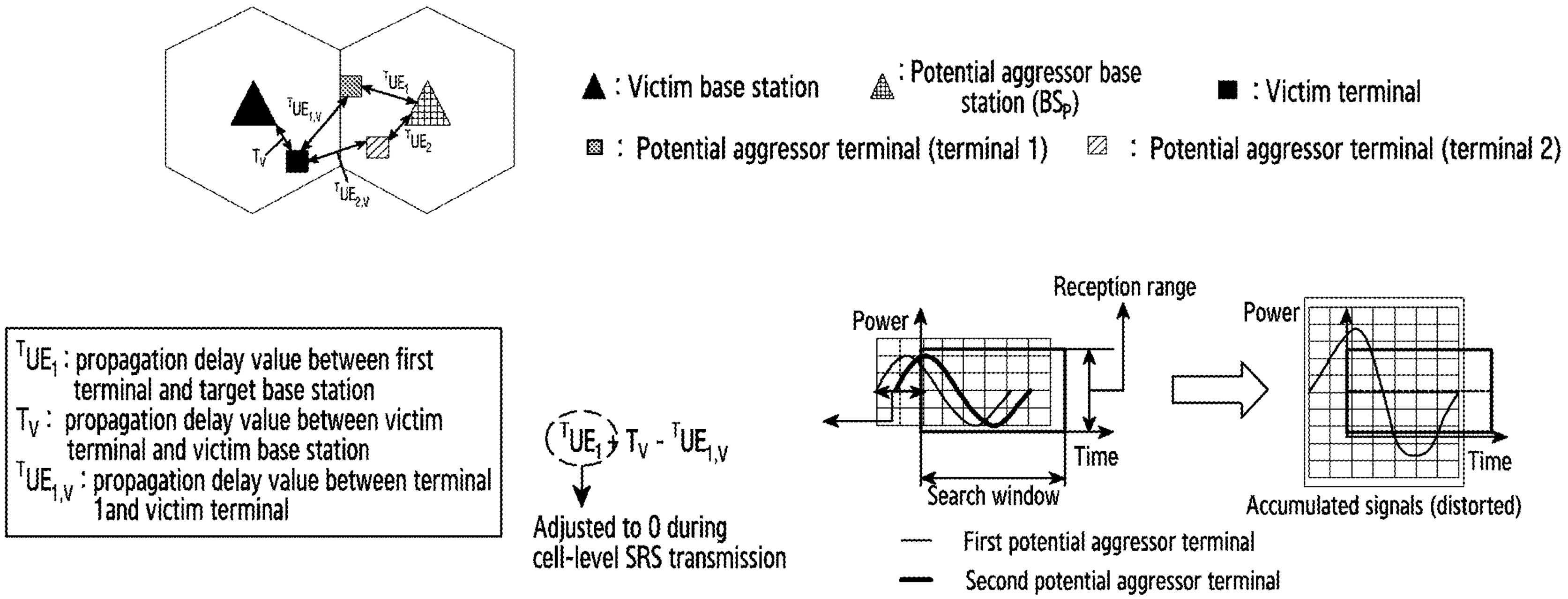
FIG. 14A illustrates a method for solving signal distortion according to various embodiments of the present disclosure.

FIG. 14A illustrates a method for solving signal distortion according to various embodiments of the present disclosure.

Referring to FIG. 14A, the problem of propagation delay which may occur when measuring the RSRP regarding cell-level SRSs simultaneously transmitted by potential aggressor terminals positioned in respective adjacent cells may be described. With regard to respective potential aggressor terminals which transmit cell-level SRSs, the distance to a serving base station (for example, a potential aggressor base station) and the distance to a victim base station may differ. Therefore, even if potential aggressor terminals which transmit a cell-level SRS transmit the cell-level SRS by using the same sequence by using the same time and frequency resources, the cell-level SRS received by a victim terminal may be distorted, thereby lowering the correlation with the sequence during transmission. Therefore, RSRP measurement regarding a cell-level SRS is based on auto-correlation of the SRS signal, and the accuracy of the RSRP measurement value may be lowered.

A propagation delay value may be defined by Equation 1 below:

$$T_{UE1}+T_V-T_{UE1,V} \quad \text{[Equation 1]}$$

In Equation 1, TUE1 may refer to a propagation delay value between a first terminal (for example, a potential aggressor terminal positioned in one of multiple adjacent cells) and a target base station, TV may refer to a propagation delay value between a victim terminal and a victim base station, and TUE1,V may refer to a propagation delay value between the first terminal and the victim base station.

In an embodiment for solving signal distortion resulting from propagation delay, when transmitting a cell-level SRS, each potential aggressor terminal may transmit the same in advance of existing transmission timing by TUEx (for example, transmit the same earlier by TUEx). When configuring SRS resource configuration information for a potential aggressor terminal, a potential aggressor base station may further include a flag (for example, a binary flag) for adjusting transmission timing. For example, a flag value of 1 may indicate that transmission is to be made at the same transmission timing as uplink data because there is no problem of propagation delay due to UE-level SRS transmission, and a flag value of 0 may indicate that transmission is to be made in advance by TUEx.

Figure 14B:
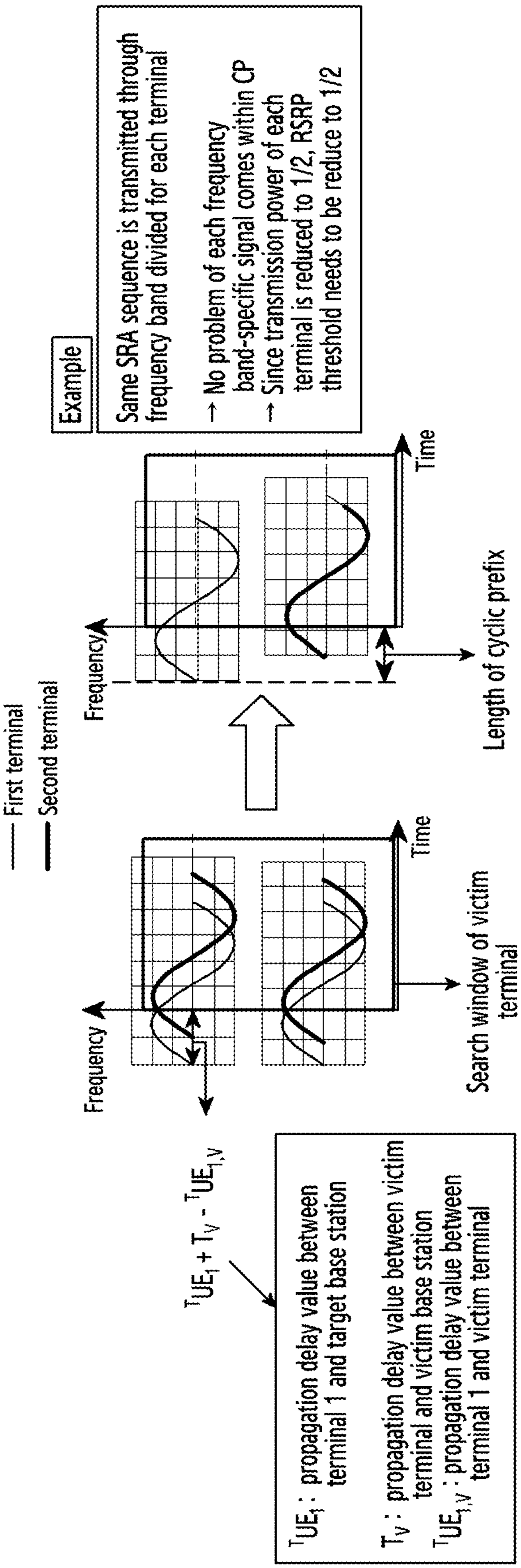
FIG. 14B illustrates a method for solving signal distortion according to various embodiments of the present disclosure.

FIG. 14B illustrates a method for solving signal distortion according to various embodiments of the present disclosure.

Referring to FIG. 14B, an embodiment for solving signal distortion due to propagation delay may be described. In an embodiment, potential aggressor terminals supposed to transmit the same cell-level SRS may transmit a cell-level SRS having the same sequence in frequency bands which are different in respective cells. Assuming that signals in all bands are received within the cyclic prefix (CP) even if the transmission timing is different in each frequency band, there may be no error in the RSRP measurement value regarding the cell-level SRS.

Assuming that the number of different frequency bands through which a cell-level SRS is transmitted is N, UE-specific transmission power may be reduced by 1/N. however, when a victim base station detects an aggressor cell, transmission power is reduced by 1/N, and the threshold of RSRP may also need to be reduced by 1/N. In addition, since respective terminals have no overlapping transmitted signals, reception power may be the same as when a single terminal makes transmission, and the ADC saturation problem may also be solved because transmission power is identical to reception power. However, available resource blocks (RB) for assigning different frequency bands to respective terminals may be insufficient. For example, during RSRP measurement regarding a cell-level SRS, the SRS size is 48 RB, and even if the bandwidth is 100 MHz (273 RB), frequency division multiplexing (FDM) may be possible only for a maximum of five terminals.

Figure 15:
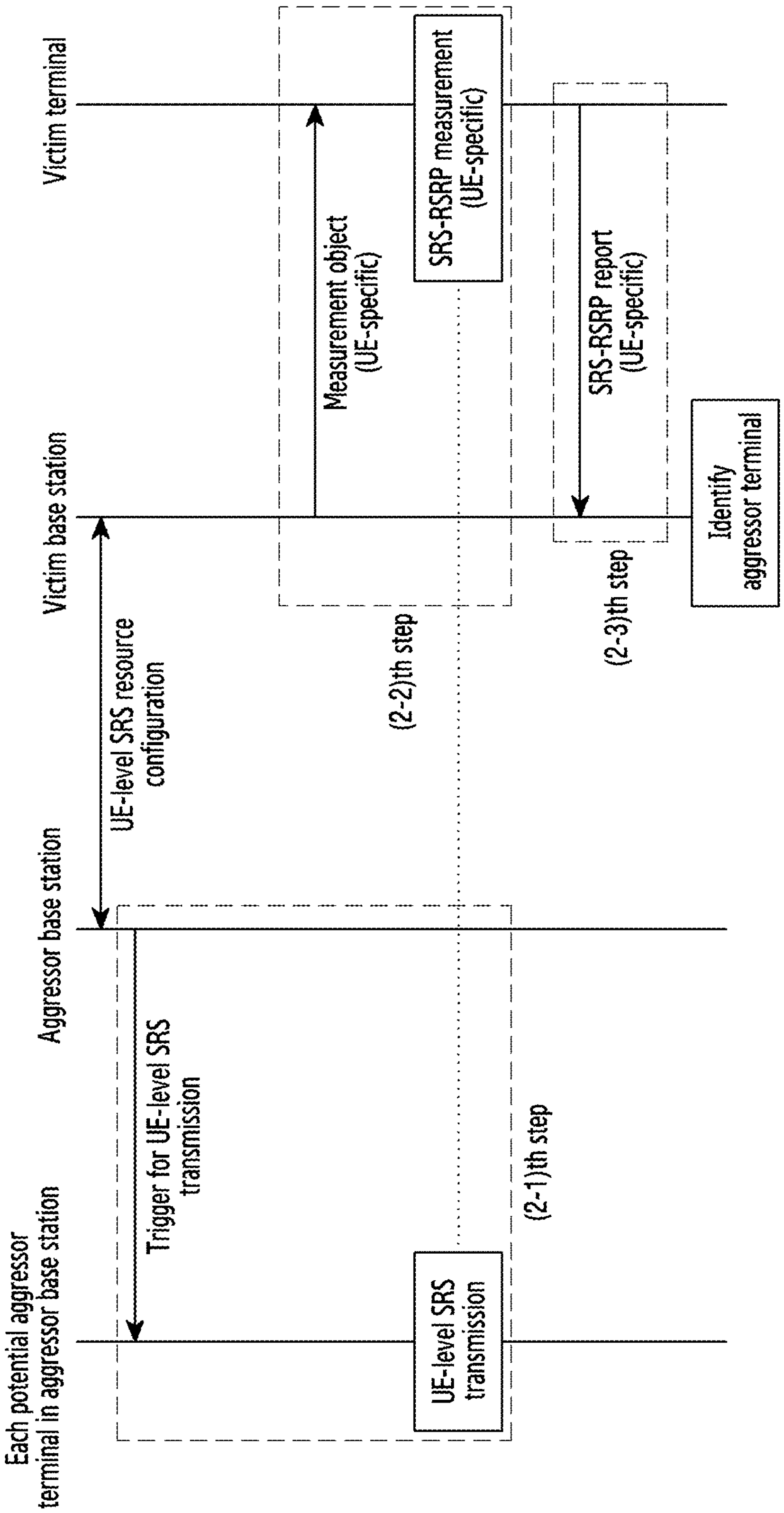
FIG. 15 illustrates a UE-level CLI measurement method according to various embodiments of the present disclosure.

FIG. 15 illustrates a UE-level CLI measurement method according to various embodiments of the present disclosure.

Referring to FIG. 15, a flow of operations between base stations and terminals positioned in a cell in which a victim terminal is positioned, and in a cell identified as an aggressor cell (for example, a cell in which an aggressor base station and potential aggressor terminals are positioned) through a first step. A victim base station may share a UE-level SRS resource configuration with an aggressor base station in a cell identified as an aggressor cell through a first step. The SRS for detecting the channel state is only an example, and another RS may be used. For example, a CLI measurement RS may be used. The CLI measurement RS may be an RS designed for UE-to-UE CLI measurement. The CLI measurement RS may be a signal for informing a terminal which transmits the RS that the RS will be transmitted in a specific position on a resource grid based on a resource configuration of a base station. In addition, the CLI measurement RS may be a signal for informing a terminal which receives the RS of a sequence used to transmit the RS, based on a resource configuration of a base station. Meanwhile, in the absence of an aggressor cell among adjacent cells, the victim base station may not share the UE-level SRS resource configuration with an aggressor base station.

In the (2-1)th step, the aggressor base station may trigger UE-level SRS transmission from potential aggressor terminals positioned in the corresponding cell, based on cell-level SRS resource configuration information shared with the victim base station. If UE-level SRS transmission is triggered by the aggressor base station, potential aggressor terminals may transmit a UE-level SRS to a victim terminal. In this case, potential aggressor terminals may transmit the UE-level SRS by transmitting the same sequence through the same time and frequency resources, or by transmitting different sequences through the same frequency resource.

In the (2-2)th step, the victim base station may transmit information regarding a UE-specific measurement object to the victim terminal through upper-layer signaling (for example, RRC message). The information regarding a measurement object may include information regarding UE-level SRS resourced to be transmitted by potential aggressor terminals. In addition, the victim base station may trigger RSRP measurement regarding a UE-level SRS by the victim terminal through the information regarding a measurement object. For example, the victim base station may transmit the information regarding a measurement object to the victim terminal, thereby instructing the victim terminal to measure the RSRP regarding a UE-level SRS received from potential aggressor terminals. The victim terminal may measure the RSRP regarding a UE-level SRS received from potential aggressor terminals. Since respective potential aggressor terminals transmit different UE-level SRS resources and sequences, the victim terminal may measure the RSRP regarding a UE-level SRS with regard to each potential aggressor terminal.

In addition, when further performing an intra-cell measurement operation, the victim terminal may receive UE-level SRSs from intra-cell potential aggressor terminals (for example, terminals other than the victim terminal in the first cell). The information regarding a measurement object may include information regrading UE-level SRS resourced to be transmitted by the intra-cell potential aggressor terminals. In addition, the information regarding a measurement object may trigger RSRP measurement regarding a UE-level SRS by the intra-cell potential aggressor terminals.

In the (2-3)th step, the victim terminal may transmit a UE-level RSRP report resulting from measurement with regard to each potential aggressor terminal to the victim base station. The UE-level RSRP report may include RSRP measurement values of UE-level SRSs used by the victim base station to determine an aggressor terminal among potential aggressor terminals. In an embodiment, the victim terminal may report a pair of a UE-level RSRP measurement value and a resource ID (for example, the ID of a resource used to transmit a UE-level SRS with regard to each potential aggressor terminal) to the victim base station. In an embodiment, the victim terminal may sort resource IDs in descending order of the UE-level RSRP measurement value and may report resource IDs to the victim base station. In an embodiment, the victim terminal may select N (for example, N is an integer equal to/larger than 1) resource IDs in descending order of the UE-level RSRP measurement value and may report N pairs of resource IDs and RSRP measurement values regarding UE-level SRSs to the victim base station. In an embodiment, the victim terminal may report a pair of a resource ID and an RSRP measurement value regarding a UE-level SRS to the victim base station, the RSRP measurement value regarding a UE-level SRS being equal to/larger than a specific threshold. In an embodiment, the victim terminal may report a resource ID corresponding to an RSRP measurement value regarding a UE-level SRS to the victim base station, the RSRP measurement value regarding the UE-level SRS being equal to/larger than a specific threshold.

The UE-level RSRP report may include an index (for example, a threshold or a maximum value) used by the victim base station to determine an aggressor terminal. For example, upon receiving the UE-level RSRP report, the victim base station may identify (or verify) that the corresponding aggressor terminal is an aggressor terminal if the UE-level SRS is larger than a specific threshold. The UE-level RSRP report may be transmitted from the victim terminal to the victim base station through upper-layer signaling (for example, RRC message). Alternatively, the UE-level RSRP report may be transmitted through a physical layer between the victim base station and the victim terminal.

Figure 16:
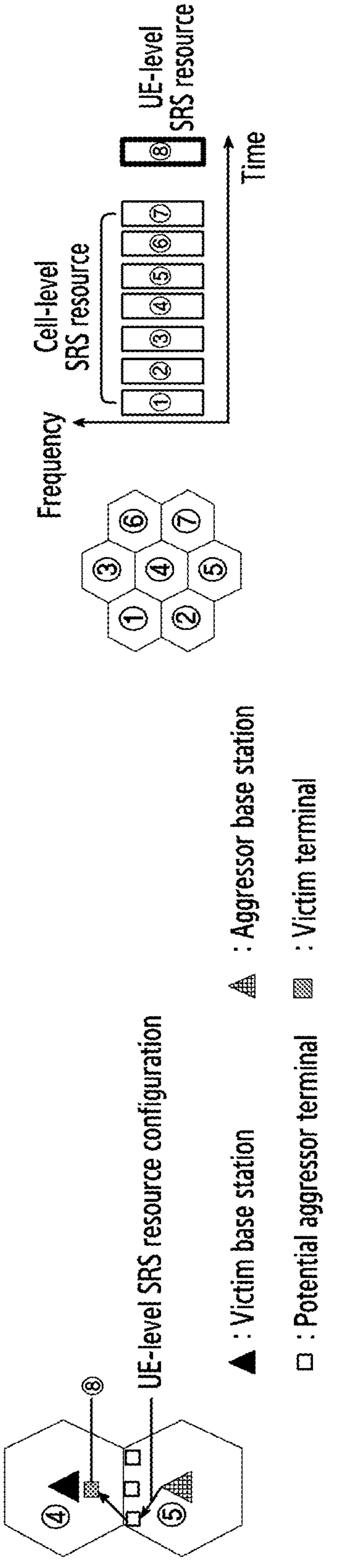
FIG. 16 illustrates an inter-cell UE-level SRS resource configuration method according to various embodiments of the present disclosure.

FIG. 16 illustrates an inter-cell UE-level SRS resource configuration method according to various embodiments of the present disclosure.

Referring to FIG. 16, UE-level SRS resource configuration information may be configured by sharing an SRS resource configuration between a victim base station and an aggressor base station, and a UE-level SRS resource may be configured so as not to overlap cell-level SRS resources. The SRS resource configuration information may include information regarding at least one of resource ID, starting RB, RB length, comb factor (for example, factor for multiplexing multiple SRSs), slot/symbol index, sequence ID, period, or power. The resource ID may be configured differently with regard to respective potential aggressor terminals. In addition, the UE-level SRS resource configuration information may further include a flag for distinction from a cell-level SRS resource (for example, a flag value of 1 indicates a UE-level SRS resource).

Meanwhile, a potential victim base station may need to configure potential aggressor terminals as multiple terminal groups. Therefore, the potential victim base station may differently configure UE-level SRS resource configuration information with regard to each terminal group, thereby saving resources compared with a case in which UE-level SRS resources are configured with regard to respective potential aggressor terminals.

Figure 17:
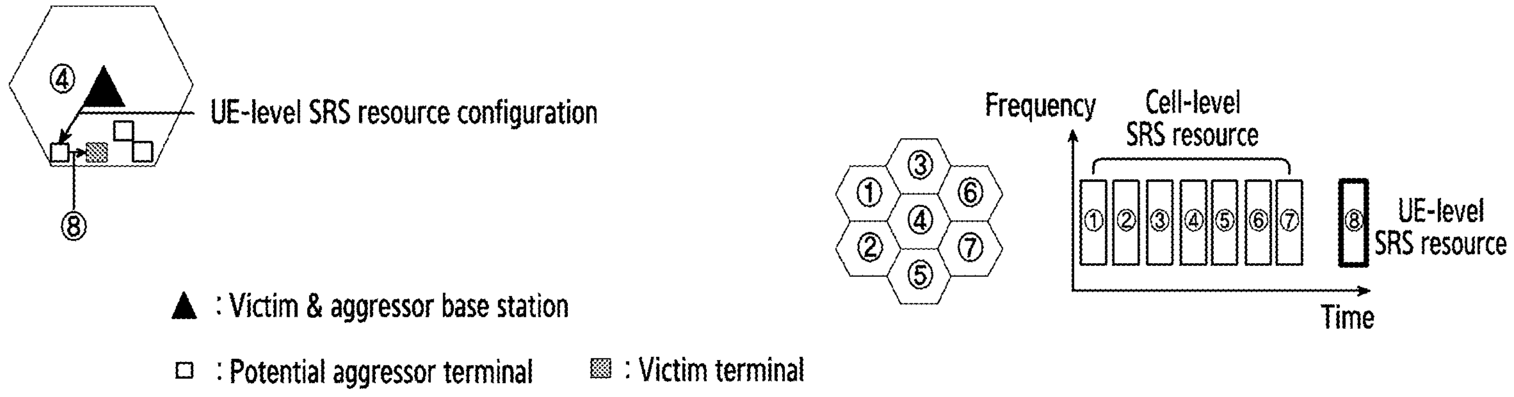
FIG. 17 illustrates an intra-cell UE-level SRS resource configuration method according to various embodiments of the present disclosure.

FIG. 17 illustrates an intra-cell UE-level SRS resource configuration method according to various embodiments of the present disclosure.

Referring to FIG. 17, when performing intra-cell UE-to-UE CLI measurement, a victim base station may configure resources for UE-level SRS transmission by intra-cell potential aggressor terminals. The resources for UE-level SRS transmission by intra-cell potential aggressor terminals may be configured for different time and frequency resources with regard to respective potential aggressor terminals. In addition, UE-level SRSs transmitted by the intra-cell potential aggressor terminals may have different sequences.

Figure 18:
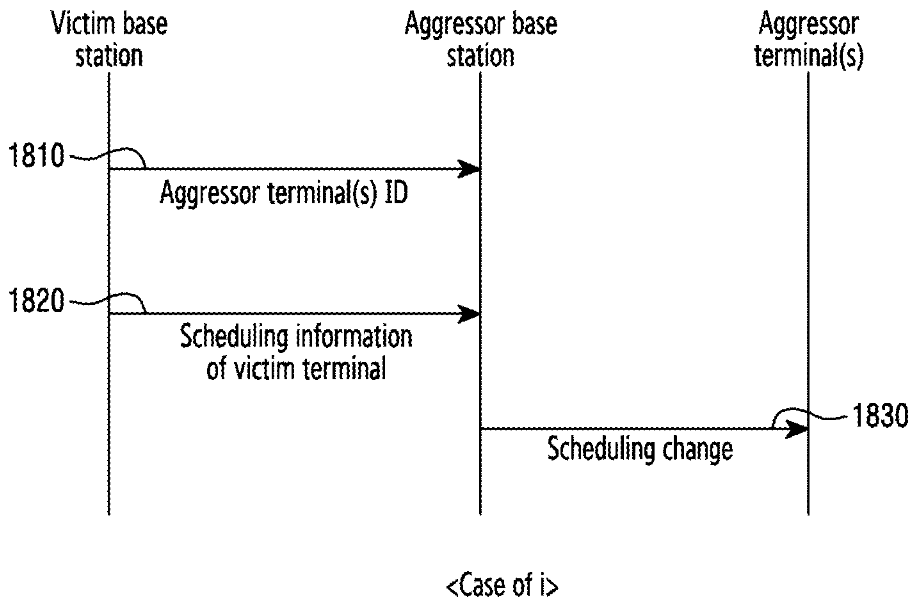
FIG. 18 illustrates a UE-to-UE CLI mitigation method according to various embodiments of the present disclosure.

FIG. 18 illustrates a UE-to-UE CLI mitigation method according to various embodiments of the present disclosure.

Referring to FIG. 18, a scheduling method by an aggressor base station, in order to mitigate interference with aggressor terminal(s), after UE-to-UE CLI measurement is completed, may be described.

In step 1810, as an inter-cell CLI mitigation method, a victim base station may transmit a message including identification information of aggressor terminal(s) (for example, ID of aggressor terminals) and scheduling information of a victim terminal to an aggressor base station through an inter-base station interface (for example, Xn interface).

In step 1820, the victim base station may transmit a message including scheduling information of the victim terminal to the aggressor base station through an inter-base station interface (for example, Xn interface).

In step 1830, the aggressor base station may reschedule aggressor terminal(s), based on the identification information of aggressor terminal(s) and the scheduling information of the victim terminal, received from the victim base station. For example, the aggressor base station may schedule aggressor terminal(s) so as to not to perform uplink transmission while the victim terminal receives downlink data.

However, the victim base station may periodically measure the UE-level RSRP of aggressor terminal(s) and, if the UE-level RSRP measurement value is smaller than a threshold included in UE-level SRS resource configuration information, the victim base station may not change scheduling of the aggressor terminal(s). That is, scheduling of the aggressor terminal(s) and the victim terminal may be decoupled, and this may mean that scheduling regarding the victim terminal and scheduling regarding the victim terminal are independently performed without influencing each other.

Meanwhile, in order to mitigate intra-cell CLI interference, the victim base station may reschedule intra-cell aggressor terminals. For example, the victim base station may schedule aggressor terminal(s) so as to not to perform uplink transmission while the victim terminal receives downlink data.

In addition to the above-describe scheduling change method, the aggressor base station may limit (or cancel) scheduling of aggressor terminal(s). Alternatively, the aggressor base station may limit uplink transmission power of aggressor terminal(s). For example, the aggressor base station may limit transmission power such that the uplink signal from the aggressor terminal(s) is smaller than a threshold included in UE-level SRS resource configuration information. Alternatively, the victim base station may limit (or cancel) scheduling of the victim terminal.

Figure 19:
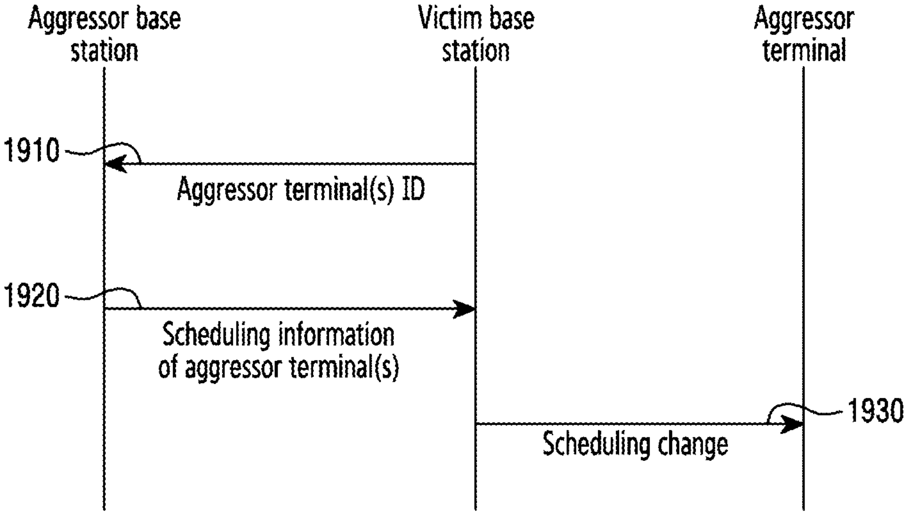
FIG. 19 illustrates a UE-to-UE CLI mitigation method according to various embodiments of the present disclosure.

FIG. 19 illustrates a UE-to-UE CLI mitigation method according to various embodiments of the present disclosure.

Referring to FIG. 19, a scheduling method by a victim base station, in order to mitigate interference with aggressor terminal(s), after UE-to-UE CLI measurement is completed, may be described.

In step 1910, as an inter-cell CLI mitigation method, a victim base station may transmit a message including identification information of aggressor terminal(s) (for example, ID of aggressor terminals) and scheduling information of a victim terminal to an aggressor base station through an inter-base station interface (for example, Xn interface).

In step 1920, the aggressor base station may transmit a message including scheduling information of aggressor terminal(s) to the aggressor base station through an inter-base station interface (for example, Xn interface).

In step 1930, the victim base station may schedule the victim terminal, based on scheduling information of the aggressor terminal(s) received from the aggressor base station. For example, the victim base station may schedule the victim terminal so as not to receive downlink data while the aggressor terminal(s) transmit uplink data.

However, the victim base station may periodically measure the UE-level RSRP of aggressor terminal(s) and, if the UE-level RSRP measurement value is smaller than a threshold included in UE-level SRS resource configuration information, the victim base station may not change scheduling of the victim terminal. That is, scheduling of the aggressor terminal(s) and the victim terminal may be decoupled, and this may mean that scheduling regarding the aggressor terminal and scheduling regarding the victim terminal are independently performed without influencing each other.

Meanwhile, in order to mitigate intra-cell CLI interference, the victim base station may reschedule intra-cell aggressor terminals. For example, the victim base station may schedule aggressor terminal(s) so as to not to perform uplink transmission while the victim terminal receives downlink data.

In addition to the above-describe scheduling change method, the aggressor base station may limit (or cancel) scheduling of aggressor terminal(s). Alternatively, the aggressor base station may limit uplink transmission power of aggressor terminal(s). For example, the aggressor base station may limit transmission power such that the uplink signal from the aggressor terminal(s) is smaller than a threshold included in UE-level SRS resource configuration information. Alternatively, the victim base station may limit (or cancel) scheduling of the victim terminal.

Figure 20:
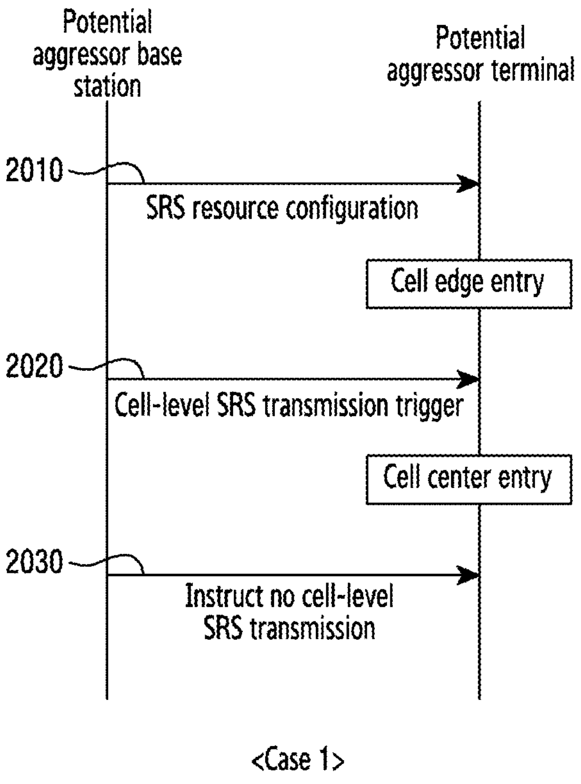
FIG. 20 illustrates a method for transmitting a cell-level SRS in view of the position of a terminal according to various embodiments of the present disclosure.

FIG. 20 illustrates a method for transmitting a cell-level SRS in view of the position of a terminal according to various embodiments of the present disclosure.

Referring to FIG. 20, a potential aggressor base station may transmit a cell-level SRS to a victim terminal so as to avoid only potential aggressor terminals positioned at a cell edge (or cell boundary), thereby saving resources for cell-level SRS transmission.

In step 2010, a potential aggressor base station may configure information regarding a resource for cell-level SRS transmission for a potential aggressor terminal.

In step 2020, if the potential aggressor terminal enters the cell edge, the potential aggressor base station may trigger cell-level SRS transmission from the potential aggressor terminal. If the potential aggressor terminal is positioned at the cell edge, the uplink signal from the potential aggressor terminal may have less pathloss than when the same is positioned at the cell center, and there may thus be a larger possibility that the victim terminal will undergo interference. Therefore, the potential aggressor base station may trigger cell-level SRS transmission from only the potential aggressor terminal positioned at the cell edge.

In step 2030, if the potential aggressor terminal enters the cell center, the potential aggressor base station may instruct the potential aggressor terminal to transmit no cell-level SRS. This is because, if the potential aggressor terminal is positioned at the cell center, the uplink signal from the potential aggressor terminal has a large pathloss, and there may thus be a smaller possibility that the victim terminal will undergo interference.

In steps 2020 and 2030 described above, in order to determine the position of the terminal (for example, whether the terminal is positioned at the cell center or cell edge), the potential aggressor base station may compare a measurement value (for example, CQI, RSRP of CSI-RS, or timing advance (TA)) received from the potential aggressor terminal with a specific threshold (for example, threshold of CQI, RSRP of CSI-RS, or TA). For example, the potential aggressor base station may determine that the potential aggressor terminal is positioned at the cell center if the CQI measured by the potential aggressor terminal is larger than a specific threshold (for example, CQI threshold) included in the information regarding a resource for cell-level SRS transmission. Alternatively, the potential aggressor base station may determine that the potential aggressor terminal is positioned at the cell edge if the CQI measured by the potential aggressor terminal is equal to or smaller than the specific threshold (for example, CQI threshold) included in the information regarding a resource for cell-level SRS transmission.

However, the potential aggressor base station may additionally consider a downlink beam index in addition to the position of the potential aggressor terminal. For example, the potential aggressor base station may instruct a potential aggressor terminal, even if positioned at the cell edge, to transmit no cell-level SRS, as long as the potential aggressor terminal receives a downlink signal with a specific downlink bream index.

Figure 21:
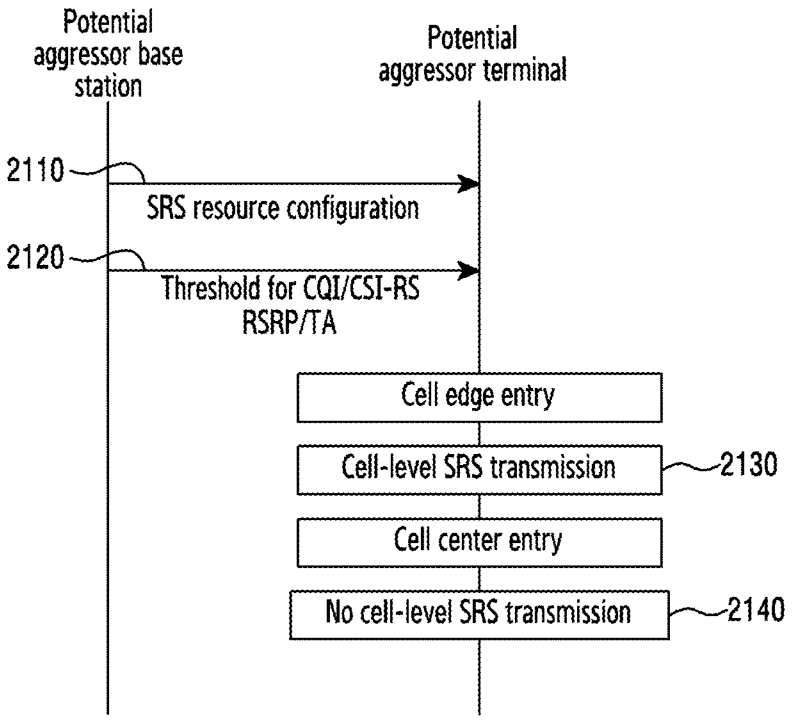
FIG. 21 illustrates a method for transmitting a cell-level SRS in view of the position of a terminal according to various embodiments of the present disclosure.

FIG. 21 illustrates a method for transmitting a cell-level SRS in view of the position of a terminal according to various embodiments of the present disclosure.

Referring to FIG. 21, a potential aggressor base station may transmit a cell-level SRS to only potential aggressor terminals positioned at a cell edge, as victim terminals, thereby saving resources for cell-level SRS transmission.

In step 2110, a potential aggressor base station may configure information regarding a resource for cell-level SRS transmission for a potential aggressor terminal.

In step 2120, the potential aggressor base station may configure, for the potential aggressor terminal, information including an index (for example, CQI, RSRP of CSI-RS, or TA threshold) used by the potential aggressor terminal to determine whether or not to transmit a cell-level SRS according to the position thereof.

In step 2130, if the potential aggressor terminal enters the cell edge, the potential aggressor terminal may transmit a cell-level SRS to the potential aggressor base station.

In step 2140, if the potential aggressor terminal enters the cell center, the potential aggressor terminal may instruct the potential aggressor base station to transmit no cell-level SRS.

For example, in steps 2120 and 2130 described above, if the CQI measured by the potential aggressor terminal is larger than a specific threshold (for example, CQI threshold) included in the information regarding a resource for cell-level SRS transmission, the potential aggressor terminal may be deemed to be positioned at the cell center. Alternatively, if the CQI measured by the potential aggressor terminal is equal to or smaller than the specific threshold (for example, CQI threshold) included in the information regarding a resource for cell-level SRS transmission, the potential aggressor terminal may be deemed to be positioned at the cell edge.

However, the potential aggressor terminal may additionally consider a downlink beam index in addition to the position of the potential aggressor terminal. For example, the potential aggressor base station may transmit no cell-level SRS to a potential aggressor terminal, even if positioned at the cell edge, as long as the potential aggressor terminal receives a downlink signal with a specific downlink bream index.

FIG. 22 illustrates a table of mapping between cell IDs and SRS resources according to various embodiments of the present disclosure.

Referring to FIG. 22, a cell-level SRS transmission method through a table of mapping between cell IDs preconfigured for potential aggressor terminals and cell-level and SRS resources may be described. A potential aggressor base station may configure a table of mapping between cell IDs and SRS resources in advance for potential aggressor terminals. Therefore, even if the potential aggressor base station transmits only cell ID related information to the potential aggressor terminals, the potential aggressor terminals may transmit a cell-level SRS to a victim terminal, based on the preconfigured mapping table. That is, even if a victim base station transmits only a cell ID of adjacent cells to a victim terminal, the victim terminal may measure the RSRP regarding the cell-level SRS transmitted by potential aggressor terminals included in an adjacent cell corresponding to the cell ID.

Therefore, unlike the non-dynamic cell-level SRS resource configuration method described above with reference to FIG. 9, the adjustment procedure (for example, step 1210) between the victim base station and the potential aggressor base station and the signaling procedure (for example, step 1220) from the potential aggressor base station to the potential aggressor terminal may be unnecessary. However, according to the scheme proposed in FIG. 22, the physical cell ID (PCI) may need to be distributed such that resources for cell-level SRS transmission do not overlap between adjacent cells.

Figure 23:
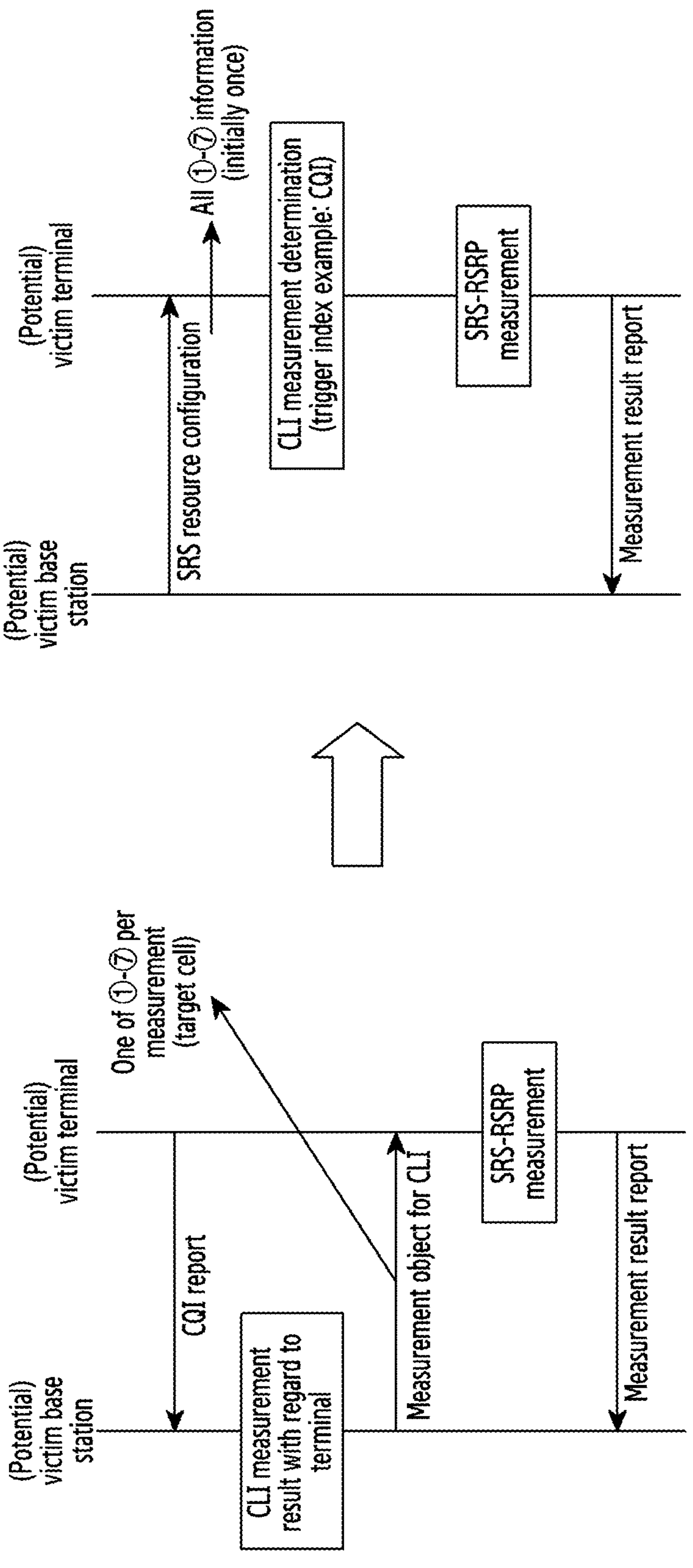
FIG. 23 illustrates a method for measuring RSRP regarding a cell-level SRS according to various embodiments of the present disclosure.

FIG. 23 illustrates a method for measuring RSRP regarding a cell-level SRS according to various embodiments of the present disclosure.

Referring to FIG. 23, a method in which a victim base station preconfigures information regarding a measurement object, instead of transmitting the same to a victim terminal every time CLI measurement is necessary, such that the victim terminal can self-determine whether or not to measure the CLI, in connection with (1-2)th step in FIG. 7, may be described. Referring to the left flowchart in FIG. 23 (that is, the procedure of (2-2)th step in FIG. 15), the victim base station may transmit information regarding a measurement object such that the victim terminal measure the RSRP regarding a cell-level SRS. Meanwhile, in another embodiment, referring to the right flowchart in FIG. 23, the potential victim base station may preconfigure information regarding a measurement object such that the potential victim terminal can self-determine CLI measurement without transmission thereof.

Particularly, the potential victim base station may preconfigure information cell-level SRS resource configuration information for the potential victim terminal through upper-layer signaling (for example, "measObjectCLI" among information elements (IE) of an RRC message). The cell-level SRS resource configuration information may include information regarding the configuration of cell-level SRS resources of all cells. The potential victim terminal may self-trigger whether or not to measure the CLI, based on CSI-RS related feedback information (for example, CQI). If the potential victim terminal determines CLI measurement, the potential victim terminal may be deemed to be a victim terminal. Therefore, the victim base station may perform no procedure for transmitting information regarding a measurement object for CLI measurement to the terminal deemed to be a victim terminal. Accordingly, the overhead resulting from signaling between the victim base station and the victim terminal (for example, measurement object related information transmission) may be reduced.

Figure 24:
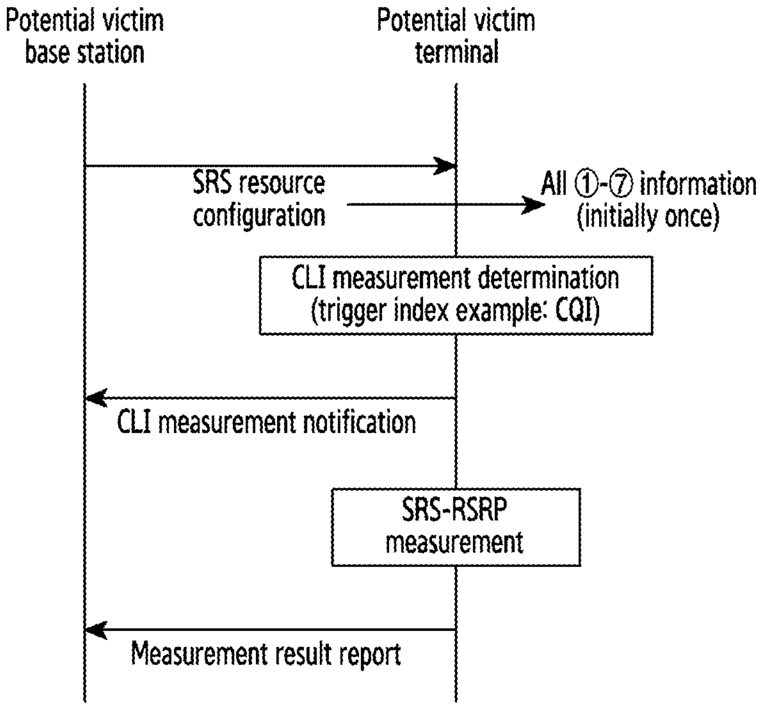
FIG. 24 illustrates a method for measuring RSRP regarding a cell-level SRS according to various embodiments of the present disclosure.

FIG. 24 illustrates a method for measuring RSRP regarding a cell-level SRS according to various embodiments of the present disclosure.

Hereinafter, descriptions overlapping those made with reference to FIG. 23 may be omitted.

Referring to FIG. 24, the victim base station which has determined CLI measurement may transmit a message including a CLI measurement notification to the victim base station prior to measuring the RSRP regarding a cell-level SRS. The victim terminal cannot transmit and/or receive signals with the victim base station while measuring CLI, and the victim base station may thus be notified of CLI measurement in advance, prior to measuring RSRP regarding a cell-level SRS, such that the victim base station can adjust scheduling regarding the victim terminal. Upon receiving a cell-level RSRP report from the victim terminal, the victim base station may determine that CLI measurement is finished.

Figure 25:
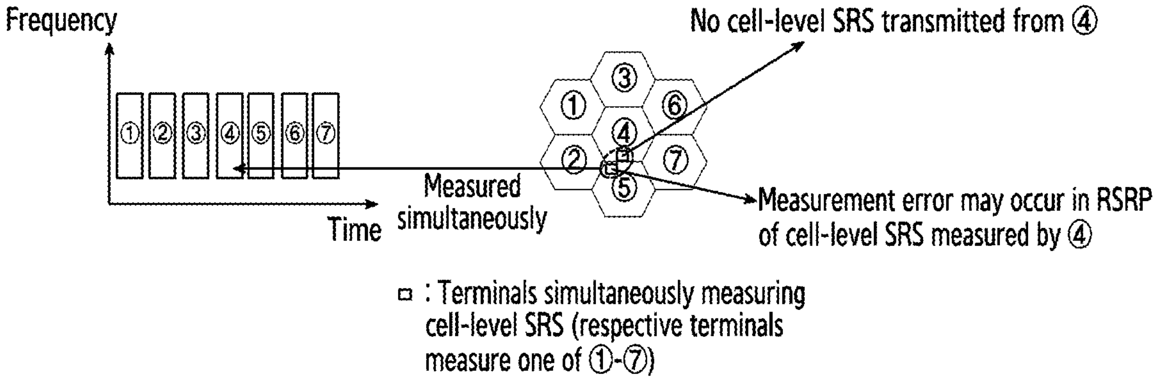
FIG. 25 illustrates a manner in which an RSRP measurement error (under estimate) occurs according to various embodiments of the present disclosure.

FIG. 25 illustrates a manner in which an RSRP measurement error (under estimate) occurs according to various embodiments of the present disclosure.

Referring to FIG. 25, when a victim terminal uses a cell-level SRS for intra-cell CLI measurement, the victim terminal may receive only cell-level SRSs of potential aggressor terminals positioned in adjacent cells without transmitting a cell-level SRS. Therefore, when multiple terminals simultaneously measure cell-level CLI in a multi-cell environment, an RSRP measurement error may occur due to terminal(s) which transmit no cell-level SRS. A scheme for compensating for such an error is necessary to improve the accuracy of CLI measurement result, and a detailed scheme for compensating for the error through measurement performance improvement will now be described with reference to FIG. 26.

Figure 26:
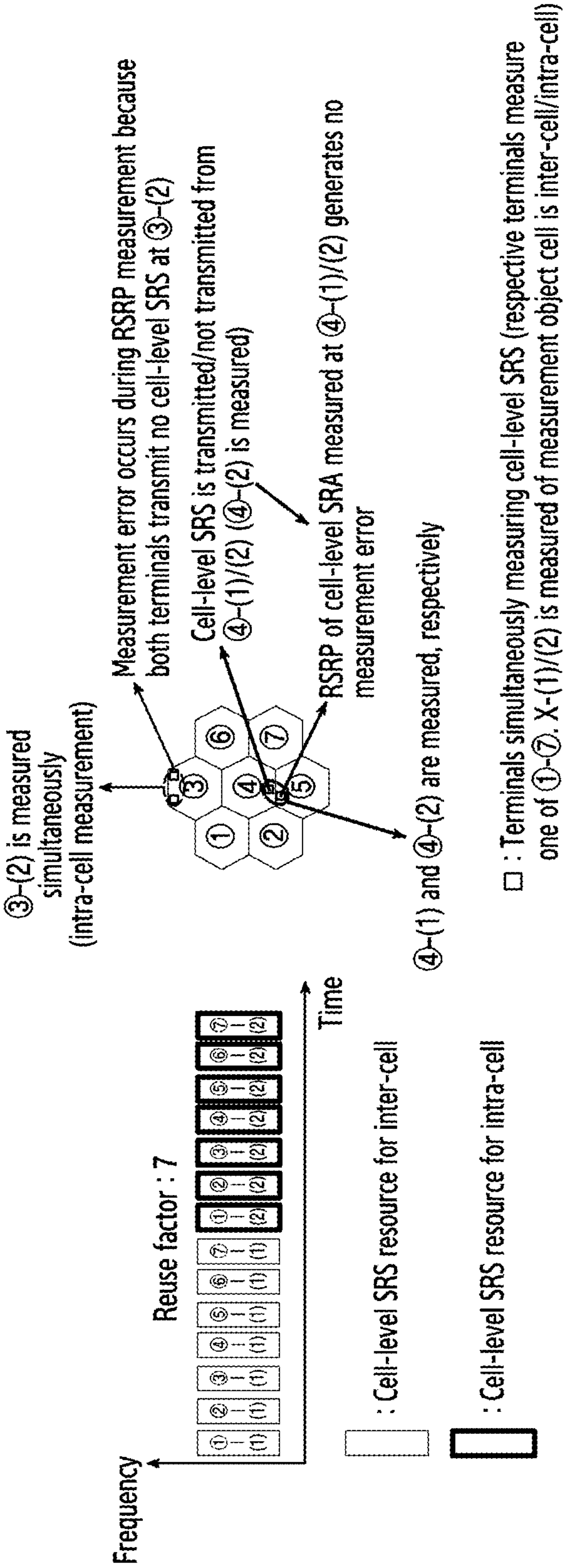
FIG. 26 illustrates a method for solving an RSRP measurement error according to various embodiments of the present disclosure.

FIG. 26 illustrates a method for solving an RSRP measurement error according to various embodiments of the present disclosure.

Referring to FIG. 26, a cell-level SRS resource configuration method for solving the RSRP measurement error in FIG. 25 may be described. The potential victim base station may configure a cell-level SRS resource for intra-cell CLI measurement separately from a cell-level SRS resource for inter-cell CLI measurement. Therefore, each terminal may transmit a cell-level SRS resource for inter-cell CLI measurement regardless of intra-cell CLI measurement, and no measurement error problem may occur in the cell-level SRS resource area for inter-cell CLI measurement. However, when multiple terminals in a single cell measure intra-cell CLI by using a cell-level SRS simultaneously, the measurement error problem may still occur in the cell-level SRS resource area for intra-cell CLI measurement.

Figure 27:
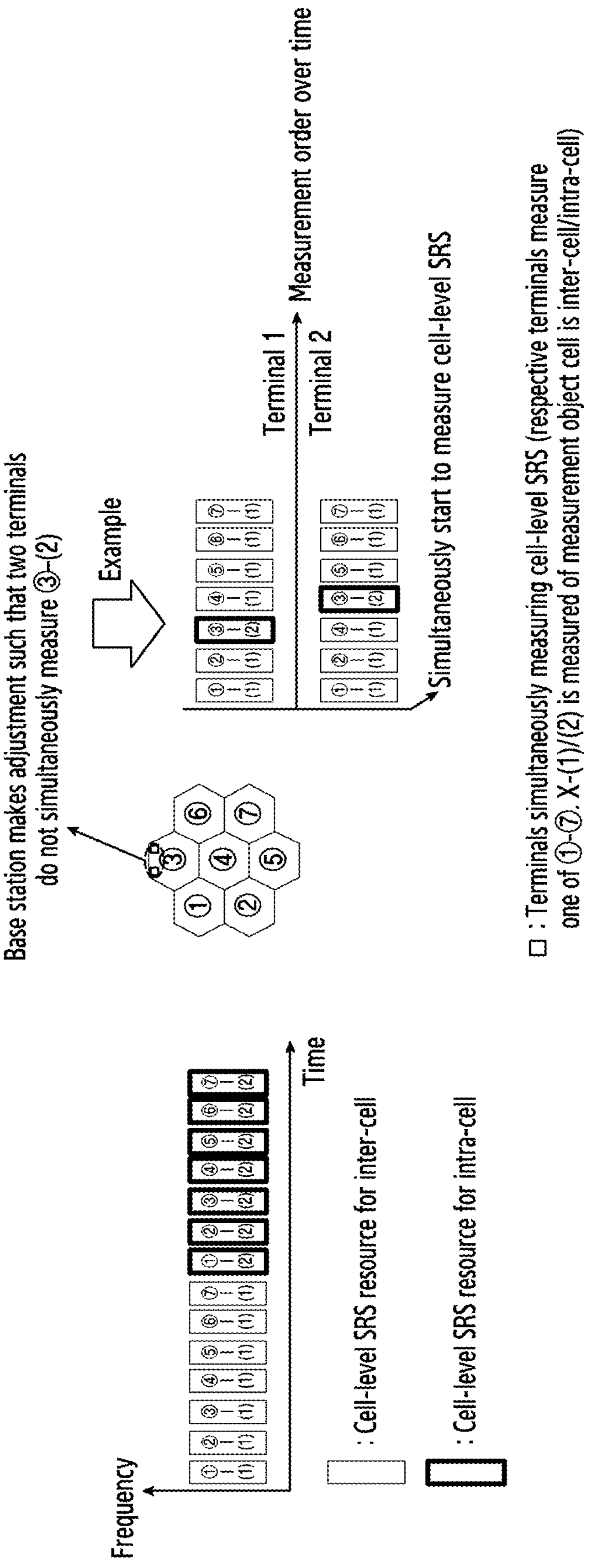
FIG. 27 illustrates a method for solving an RSRP measurement error according to various embodiments of the present disclosure.

FIG. 27 illustrates a method for solving an RSRP measurement error according to various embodiments of the present disclosure.

Referring to FIG. 27, assuming that intra-cell CLI is measured by using a cell-level SRS simultaneously in a single cell, the number of terminals which measure intra-cell CLI may be limited. For example, if number of terminals which measure intra-cell CLI is limited to one, a base station may adjust the order of measurement of terminals which receive a cell-level SRS simultaneously, thereby configuring SRS resources such that two or more terminals cannot measure intra-cell CLI by using a cell-level SRS simultaneously. Through the above-described method, no measurement error problem may occur even if intra-cell CLI is measured by using a cell-level SRS. However, it may be difficult for a terminal to determine the cell-specific cell-level CLI measurement order.

It may be necessary to exchange information regarding the configuration of a cell-level SRS resource for intra-cell CLI measurement for the sake of inter-base station adjustment. Therefore, the information regarding the configuration of a cell-level SRS resource may further include a flag (for example, a binary flag) for distinguishing a cell-level SRS resource for inter-cell CLI measurement and a cell-level SRS resource for intra-cell CLI measurement. For example, a flag value of 0 may indicate a cell-level SRS resource for inter-cell CLI measurement, and a flag value of 1 may indicate a cell-level SRS resource for intra-cell CLI measurement.

Figure 28:
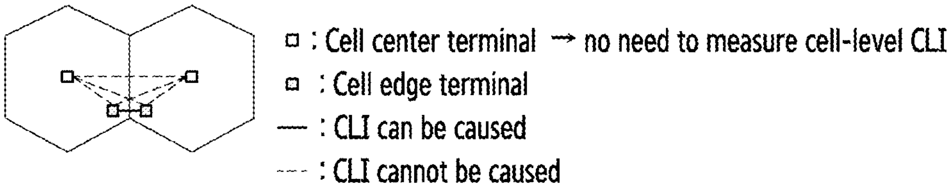
FIG. 28 illustrates a method for transmitting a cell-level SRS in view of the position of a terminal according to various embodiments of the present disclosure.

FIG. 28 illustrates a method for transmitting a cell-level SRS in view of the position of a terminal according to various embodiments of the present disclosure.

Referring to FIG. 28, for the sake of intra-cell CLI measurement, terminals other than those positioned at a cell edge may need to transmit a cell-level SRS. However, terminals positioned at the cell center are not influenced by inter-cell CLI, and may thus perform intra-cell CLI measurement by using a UE-level SRS of intra-cell terminals without measuring inter-cell CLI by using a cell-level SRS. In addition, terminals positioned at the cell center do not interfere with terminals positioned at a cell edge in the cell, and may transmit no cell-level SRS.

Figure 29:
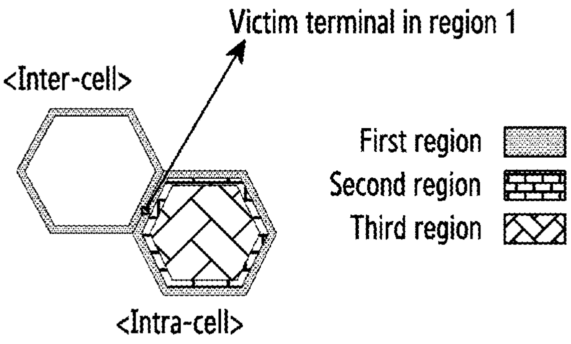
FIG. 29 illustrates a method for transmitting a cell-level SRS in view of the position of a terminal according to various embodiments of the present disclosure.

FIG. 29 illustrates a method for transmitting a cell-level SRS in view of the position of a terminal according to various embodiments of the present disclosure.

Referring to FIG. 29, a method for distinguishing a region in which cell-level SRS transmission described above with reference to FIG. 28 is unnecessary may be described. A specific cell may be divided into a first region (for example, cell edge), a second region (for example, cell intermediate), and a third region (for example, cell center), and the criterion for division may be at least one of CQI, RSRP of CSI-RS, or TA. Considering intra-cell CLI, the first, second, and third regions may cause interference with each other, but the first and third regions may have difficulty in causing interference with each other. Therefore, a terminal in the first region may transmit a cell-level SRS, but a terminal in the third region may transmit no cell-level SRS. Meanwhile, a terminal in the second region may cause intra-cell CLI in the first region, a terminal in the first region may need cell-level CLI measurement, and a terminal in the second region may thus need to transmit a cell-level SRA for intra-cell CLI measurement. However, a terminal in the second region may transmit no cell-level SRS for inter-cell CLI measurement. In summary, a terminal in the third region may transmit no cell-level SRS, and may reduce overhead resulting from cell-level SRS transmission by transmitting no cell-level SRS.

Figure 30:
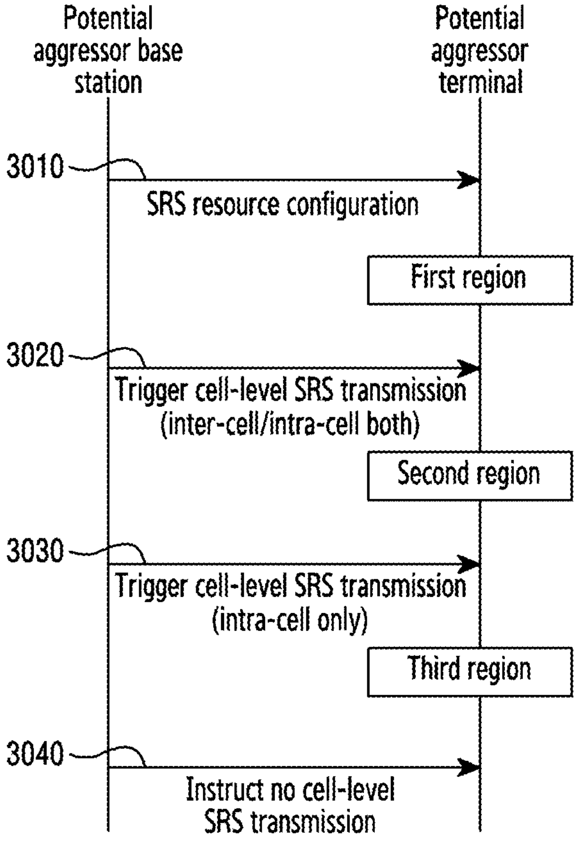
FIG. 30 illustrates a method for transmitting a cell-level SRS in view of the position of a terminal according to various embodiments of the present disclosure.

FIG. 30 illustrates a method for transmitting a cell-level SRS in view of the position of a terminal according to various embodiments of the present disclosure.

Referring to FIG. 30, a method for triggering cell-level SRS transmission in an aperiodic (or dynamic) manner, assuming that an intra-cell region is divided into first to third regions as described above with reference to FIG. 29, may be described.

In step 3010, cell-level SRS resource configuration information may be configured for potential aggressor base stations by exchanging cell-level SRS resource configuration information between a potential victim base station and potential aggressor base stations.

In step 3020, if a potential aggressor terminal enters the first region, a potential aggressor base station may trigger transmission of a cell-level SRS (for example, a cell-level SRS for intra-cell CLI measurement and a cell-level SRS for inter-cell CLI measurement) from the potential aggressor terminal.

In step 3030, if the potential aggressor terminal enters the second region, the potential aggressor base station may trigger transmission of a cell-level SRS (for example, a cell-level SRS for intra-cell CLI measurement) from the potential aggressor terminal.

In step 3040, if the potential aggressor terminal enters the third region, the potential aggressor base station may instruct the potential aggressor terminal to transmit no cell-level SRS.

Figure 31:
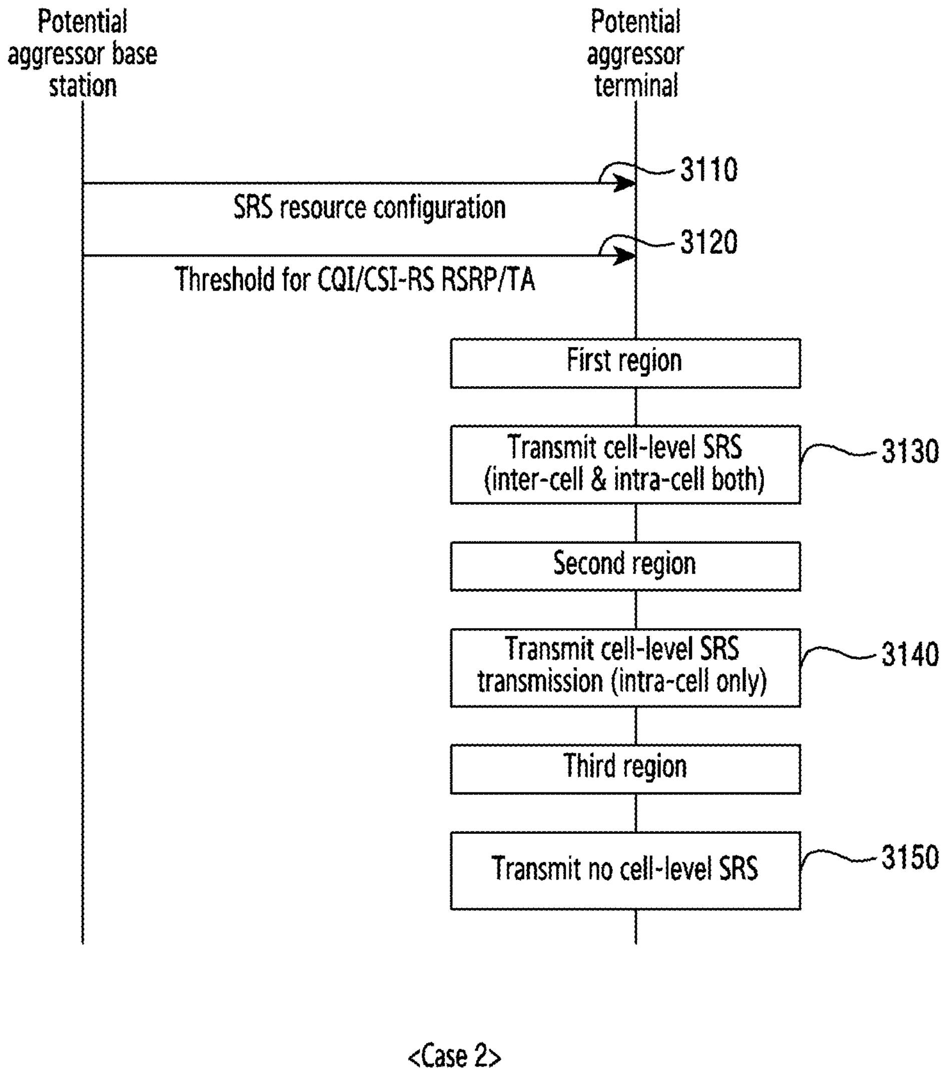
FIG. 31 illustrates a method for transmitting a cell-level SRS in view of the position of a terminal according to various embodiments of the present disclosure.

FIG. 31 illustrates a method for transmitting a cell-level SRS in view of the position of a terminal according to various embodiments of the present disclosure.

Referring to FIG. 31, a method for triggering cell-level SRS transmission in a periodic or semi-periodic (or non-dynamic) manner, assuming that an intra-cell region is divided into first to third regions as described above with reference to FIG. 29, may be described.

In step 3110, cell-level SRS resource configuration information may be configured for potential aggressor base stations by exchanging cell-level SRS resource configuration information between a potential victim base station and potential aggressor base stations.

In step 3120, a potential aggressor base station may configure information including an index (for example, CQI, RSRP of CSI-RS, or TA threshold) used by a potential aggressor terminal to determine whether or not to transmit a cell-level SRS according to the position thereof through upper-layer signaling (for example, RRC message).

In step 3130, if a potential aggressor terminal enters the first region, a potential aggressor terminal may transmit a cell-level SRS (for example, a cell-level SRS for intra-cell CLI measurement and a cell-level SRS for inter-cell CLI measurement) to the potential aggressor terminal.

In step 3140, if the potential aggressor terminal enters the second region, the potential aggressor terminal may transmit a cell-level SRS (for example, a cell-level SRS for intra-cell CLI measurement) to the potential aggressor terminal.

In step 3150, if the potential aggressor terminal enters the third region, the potential aggressor terminal may transmit no cell-level SRS to the potential aggressor base station.

FIG. 32 illustrates a mapping table of SRS resources for intra-cell and inter-cell CLI measurements according to various embodiments of the present disclosure.

Descriptions overlapping those made with reference to FIG. 22 may be omitted herein.

Referring to FIG. 32, a method for configuring a cell-level SRS resource for intra-cell measurement and a cell-level SRS resource for inter-cell measurement according to the embodiment described above with reference to FIG. 26 or FIG. 27 may be described. A potential aggressor terminal may transmit a cell-level SRS (for example, a cell-level SRS resource for intra-cell measurement and a cell-level SRS resource for inter-cell measurement) to a victim terminal, based on a preconfigured table of mapping between cell IDs and cell-level SRS resources.

Figure 33:
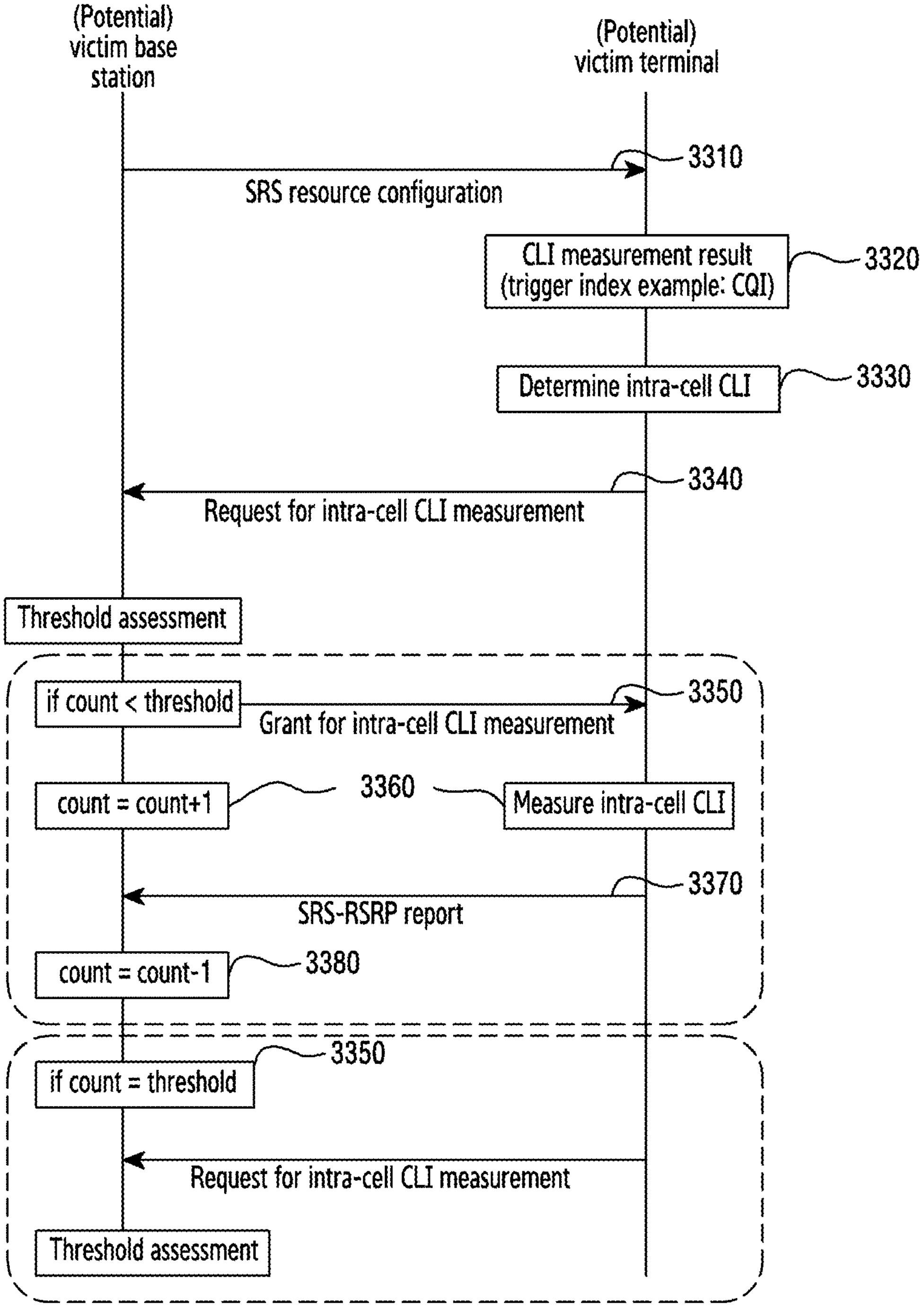
FIG. 33 illustrates an intra-cell CLI measurement method according to various embodiments of the present disclosure.

FIG. 33 illustrates an intra-cell CLI measurement method according to various embodiments of the present disclosure.

Referring to FIG. 33, an operation in which a potential victim terminal determines intra-cell measurement may be described.

In step 3310, a victim base station may preconfigure information for a victim terminal so as to enable the victim terminal to self-determine whether or not to measure CLI for the sake of intra-cell CLI measurement.

In step 3320, a potential victim terminal may self-determine whether or not to measure CLI, based on feedback information (for example, CQI) regarding CSI-RS. If the potential victim terminal determines to measure CLI, the potential victim terminal may be deemed to be a victim terminal.

In step 3330, the victim terminal may determine to measure intra-cell CLI. In step 3340, the victim terminal may transmit a message including an intra-cell CLI measurement request to the victim base station.

In step 3350, the victim base station may determine whether or not to transmit a grant for intra-cell CLI measurement with reference to a specific threshold. Particularly, if the count of victim terminals is smaller than a specific threshold, the victim base station may transmit a grant for intra-cell CLI measurement to the victim terminals. Alternatively, if the count of victim terminals is equal to the above-mentioned specific threshold, the victim base station may transmit no grant for intra-cell CLI measurement to the victim terminals. The victim terminal may again transmit a message including an intra-cell CLI measurement request to the victim base station, and the victim base station may again determine whether or not to transmit a grant for intra-cell CLI measurement with reference to the specific threshold.

In step 3360, the victim terminal may measure intra-cell CLI according to an intra-cell CLI measurement grant (for example, receive a cell-level SRS from intra-cell potential aggressor terminals and measure RSRP regarding the cell-level SRS). The victim base station may increase the count of victim terminals by 1.

In step 3370, the victim terminal may transmit a cell-level RSRP report to the victim base station.

In step 3380, the victim base station may decrease the count of total victim terminals by 1 upon receiving a measurement result from the victim terminal.

Figure 34:
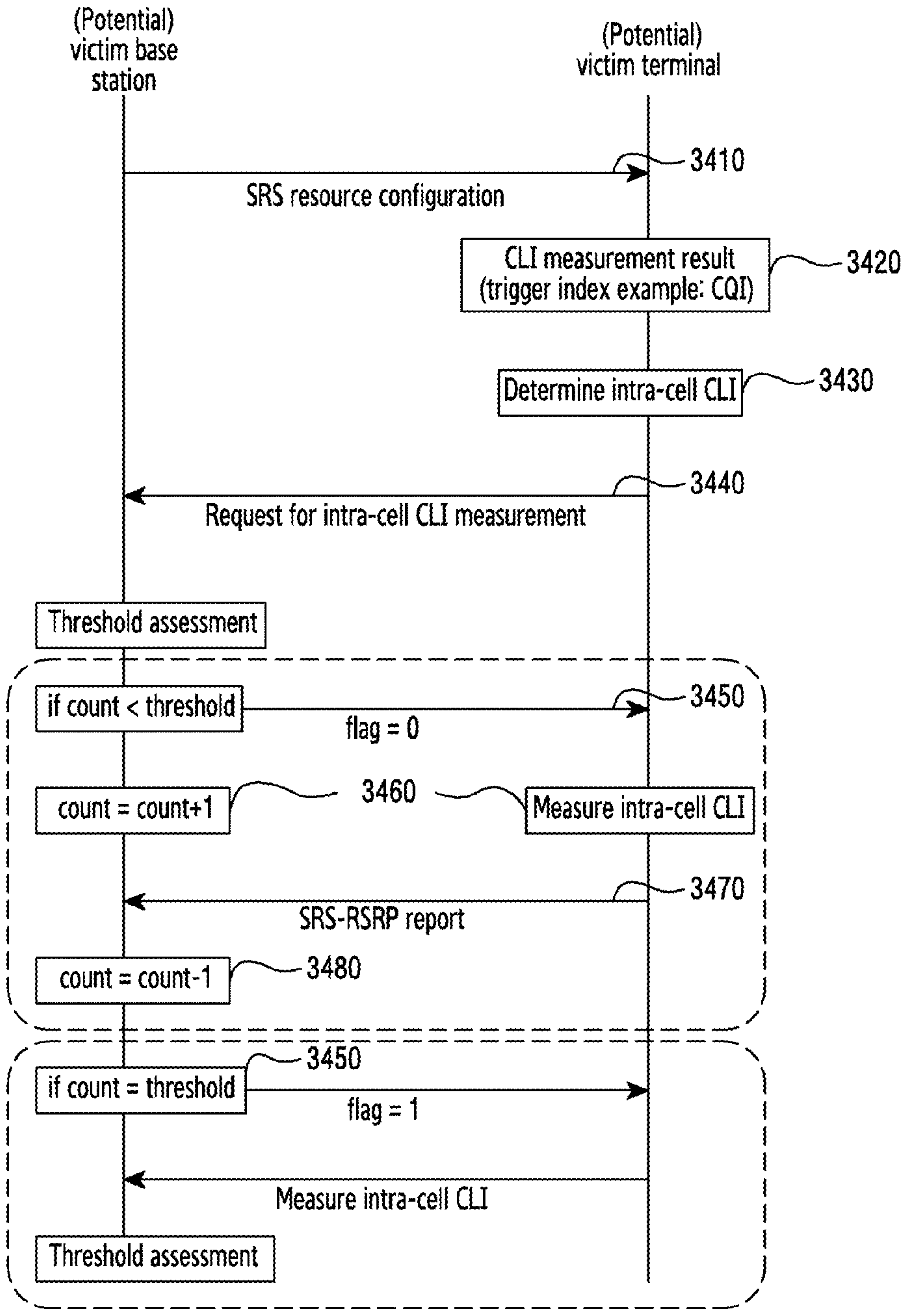
FIG. 34 illustrates an intra-cell CLI measurement method according to various embodiments of the present disclosure.

FIG. 34 illustrates an intra-cell CLI measurement method according to various embodiments of the present disclosure.

Referring to FIG. 34, an operation in which a potential victim terminal determines intra-cell measurement may be described.

In step 3410, a victim base station may preconfigure information for a victim terminal so as to enable the victim terminal to self-determine whether or not to measure CLI for the sake of intra-cell CLI measurement.

In step 3420, a potential victim terminal may self-determine whether or not to measure CLI, based on feedback information (for example, CQI) regarding CSI-RS. If the potential victim terminal determines to measure CLI, the potential victim terminal may be deemed to be a victim terminal.

In step 3430, the victim terminal may determine to measure intra-cell CLI.

In step 3440, the victim terminal may transmit a message including an intra-cell CLI measurement request to the victim base station.

In step 3450, instead of transmitting a grant for intra-cell CLI measurement to the victim terminal, the victim base station may transmit a flag (for example, a binary flag). For example, if the count of victim terminals is smaller than a specific threshold, the victim base station may transmit a flag value configured as 0 to the victim terminal. Alternatively, if the count of victim terminals if equal to the above-mentioned specific threshold, the victim base station may transmit a flag value configured as 1 to the victim terminal. As the victim terminal again transmits a message including an intra-cell CLI measurement request to the victim base station, the victim base station may again perform an operation for determining a flag value with reference to a specific threshold.

In step 3460, the victim terminal may measure intra-cell CLI according to an intra-cell CLI measurement grant (for example, receive a cell-level SRS from intra-cell potential aggressor terminals and measure RSRP regarding the cell-level SRS). The victim base station may increase the count of victim terminals by 1.

In step 3470, the victim terminal may transmit a cell-level RSRP report to the victim base station.

In step 3480, the victim base station may decrease the count of total victim terminals by 1 upon receiving a measurement result from the victim terminal.

Figure 35:
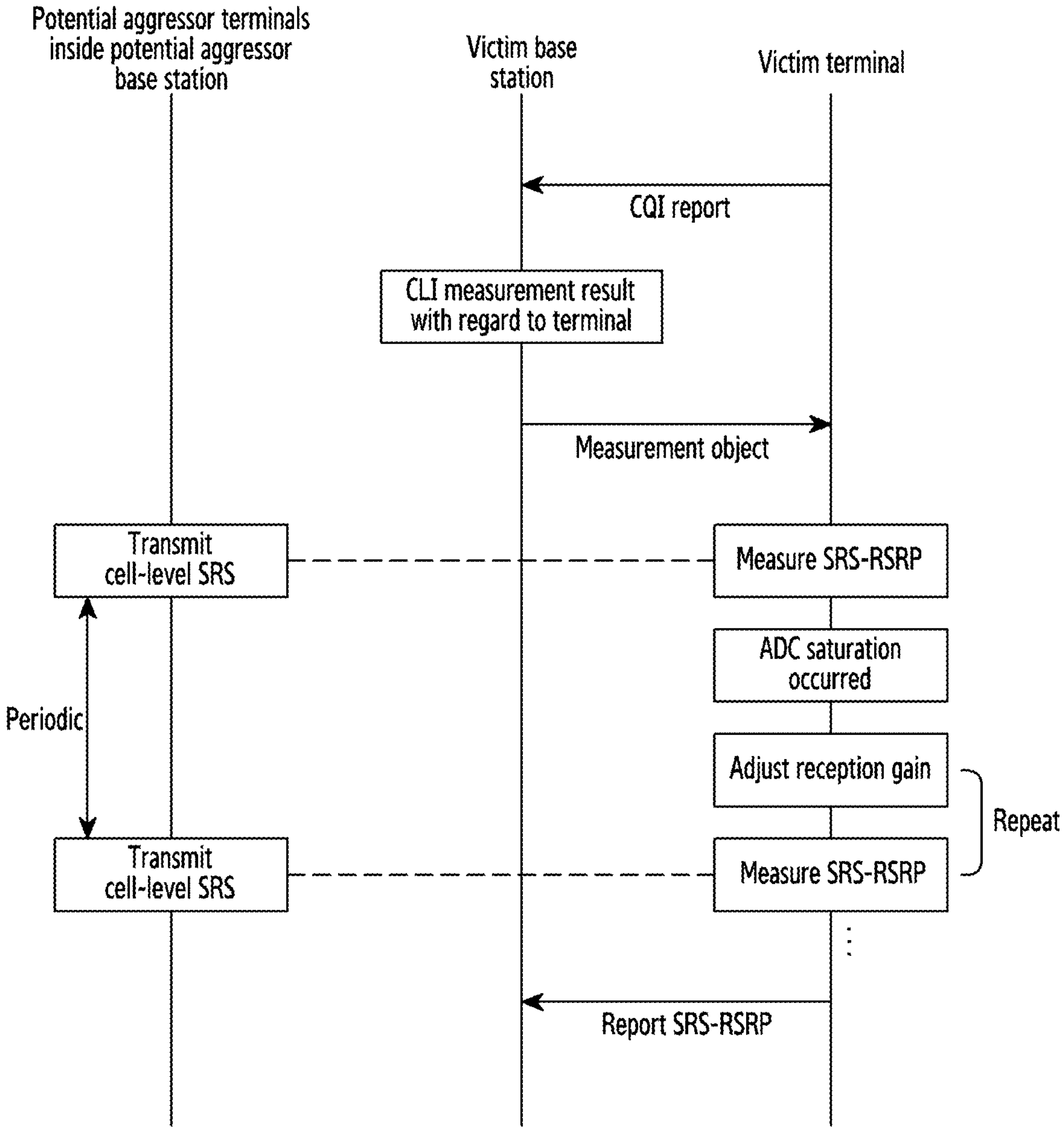
FIG. 35 illustrates a method for solving ADC saturation according to various embodiments of the present disclosure.

FIG. 35 illustrates a method for solving ADC saturation according to various embodiments of the present disclosure.

Referring to FIG. 35, cell-level SRSs transmitted from potential aggressor terminals positioned on one adjacent cell have the same sequence in the same time and frequency resources, and reception power in a victim terminal may increase compared with a UE-level SRS.

In an embodiment, if there is one potential aggressor terminal which has a dominant influence on a victim terminal among potential aggressor terminals, the influence on reception power from remaining potential aggressor terminals may be insignificant. Therefore, there may be insignificant difference between a cell-level SRS and a UE-level SRS in terms of reception power.

In an embodiment, if there are multiple potential aggressor terminals which have a dominant influence on a victim terminal among potential aggressor terminals, the cell-level SRS may have a large difference in terms of reception power compared with the UE-level SRS.

Therefore, assuming that a victim terminal has a reception gain configured according to reception of a UE-level SRS, ADC saturation may occur if a cell-level SRS is received without changing the reception gain.

If a cell-level SRS is periodically transmitted from a potential aggressor terminal, a victim terminal may measure the RSRP regarding the cell-level SRS. If ADC saturation occurs in this case, the victim terminal may adjust the reception gain (for example, lower the reception gain). The victim terminal may repeat the operation of adjusting the reception gain according to RSRP measurement regarding the cell-level SRS until no ADC saturation occurs.

Figure 36:
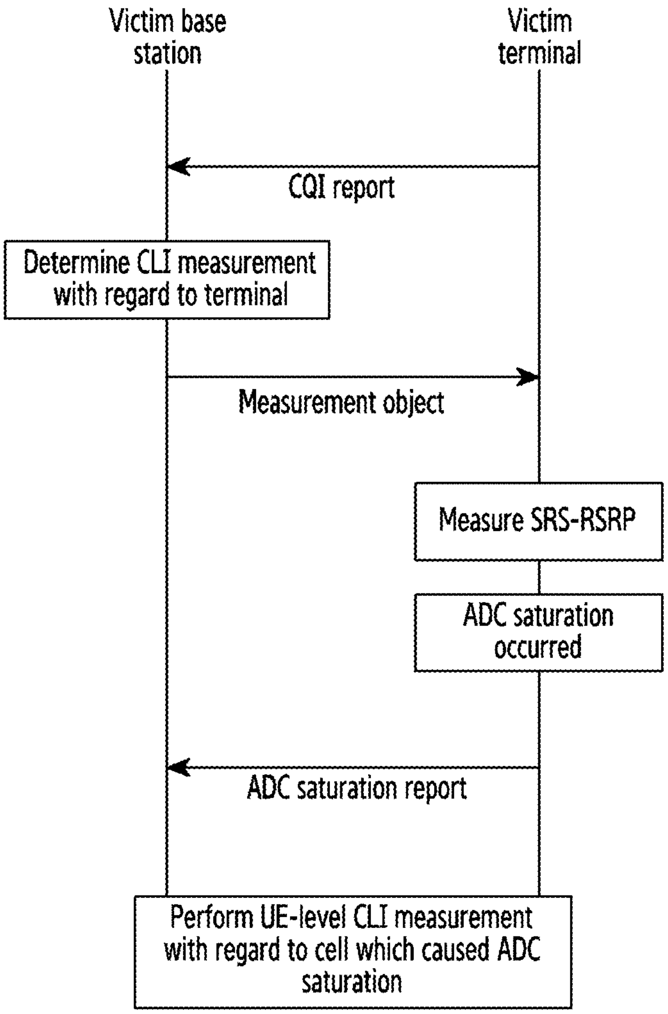
FIG. 36 illustrates a method for solving ADC saturation according to various embodiments of the present disclosure.

FIG. 36 illustrates a method for solving ADC saturation according to various embodiments of the present disclosure.

Descriptions overlapping those made with reference to FIG. 35 may be omitted herein.

Referring to FIG. 36, if ADC saturation occurs, a victim terminal may transmit an ADC saturation report to a victim base station. The victim base station may then consider that CLI occurred in the cell which caused the ADC saturation (for example, consider that the cell that caused ADC saturation is an aggressor cell), and may perform a UE-level CLI measurement procedure (for example, the procedure in FIG. 15) with the victim terminal.

Figure 37:
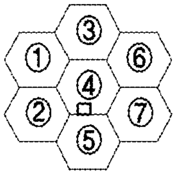
FIG. 37 illustrates an aggressor cell detection method according to various embodiments of the present disclosure.

FIG. 37 illustrates an aggressor cell detection method according to various embodiments of the present disclosure.

Referring to FIG. 37, a victim terminal may measure cell-level CLI with regard to only some cells among adjacent cells and may measure only UE-level CLI with regard to remaining adjacent cells, without measuring cell-level CLI. For example, the victim terminal may instantly measure the RSRP regarding a UE-level SRS, without measuring the RSRP regarding a cell-level SRS, with regard to a cell most adjacent to the victim terminal (for example, a cell having the highest probability that UE-to-UE CLI will occur), and may measure the RSRP regarding a cell-level SRS with regard to other adjacent cells. Therefore, the number of times RSRP is measured with regard to the cell-level SRS may be reduced, and delay may be reduced during the entire RSRP measurement process as the number of times RSRP is measured with regard to the cell-level SRS is reduced.

As described above, a method for operating a terminal in a wireless communication system according to various embodiments disclosed herein may include a step of receiving, from a base station, information indicating that cross-link interference (CLI) measurement is triggered by selecting the terminal as a victim terminal, a step of receiving one or more cell-level reference signals (RSs) from one or more terminals in a second cell adjacent to a first cell in which the terminal is positioned, after the CLI measurement is triggered, and a step of transmitting, to the base station, a cell-level measurement report including a result of measuring reference signal received power (RSRP) of the one or more received cell-level RSs. The one or more cell-level RSs may be received with an identical sequence on an identical radio resource.

According to various embodiments disclosed herein, the method for operating a terminal may further include a step of receiving one or more UE-level RSs from one or more terminals in the second cell in case that the second cell is selected as an aggressor cell, based on the cell-level measurement report, and a step of transmitting, to the base station, a UE-level measurement report including a result of measuring RSRP of the received one or more UE-level RSs.

According to various embodiments disclosed herein, the method for operating a terminal may further include a step of, in case that one or more aggressor terminals are selected from the one or more terminals in the second cell, based on the UE-level measurement report, receiving scheduling information configured in view of CLI with the one or more aggressor terminals from the base station, and a step of performing uplink transmission to the base station, based on the scheduling information.

According to various embodiments disclosed herein, cell-level RSs received from multiple cells adjacent to the first cell may be different from each other with regard to the multiple cells, respectively.

According to various embodiments disclosed herein, the information indicating that CLI measurement is triggered may include a measurement object message, and the measurement object message may include information on transmission resources of the cell-level RSs, respectively.

As described above, a method for operating a base station in a wireless communication system according to various embodiments disclosed herein may include a step of, in case that channel quality information included in a channel status information (CSI) report received from a terminal is smaller than a first threshold, selecting the terminal as a victim terminal, a step of transmitting, to the victim terminal, information indicating that CLI measurement is triggered, a step of receiving, from the terminal, cell-level measurement report including a result of measuring reference signal received power (RSRP) of multiple cell-level reference signals (RSs) of multiple cells adjacent to a first cell in which the terminal is positioned, after the CLI measurement is triggered, and a step of selecting, based on the cell-level measurement report, a cell corresponding to RSRP equal to/higher than a second threshold as an aggressor cell. The multiple cell-level RSs may be transmitted with an identical sequence on an identical radio resource, and the first threshold and the second threshold may be different from each other.

According to various embodiments disclosed herein, the method for operating a base station may further include a step of receiving, from the terminal, a UE-level measurement report including a result of measuring RSRP of one or more UE-level RSs of the aggressor cell, and a step of selecting, based on the UE-level measurement report, a terminal corresponding to RSRP equal to/higher than a third threshold as an aggressor terminal.

According to various embodiments disclosed herein, the method for operating a base station may further include a step of, in case that one or more aggressor terminals are selected based on the UE-level measurement report, transmitting, to the terminal, scheduling information configured in view of CLI with the one or more aggressor terminals, and a step of receiving uplink data from the terminal, based on the scheduling information.

According to various embodiments disclosed herein, cell-level RSs received from multiple cells adjacent to the first cell may be different from each other with regard to the multiple cells, respectively.

According to various embodiments disclosed herein, the information indicating that CLI measurement is triggered may include a measurement object message, and the measurement object message may include information on transmission resources of the cell-level RSs, respectively.

As described above, a terminal device in a wireless communication system according to various embodiments disclosed herein may include a transceiver, a memory, and a controller. The controller may receive, from a base station, information indicating that crosslink interference (CLI) measurement is triggered by selecting the terminal as a victim terminal, may receive one or more cell-level reference signals (RSs) from one or more terminals in a second cell adjacent to a first cell in which the terminal is positioned, after the CLI measurement is triggered, and may transmit, to the base station, a cell-level measurement report including a result of measuring reference signal received power (RSRP) of the one or more received cell-level RSs. The one or more cell-level RSs may be received with an identical sequence on an identical radio resource.

According to various embodiments disclosed herein, the controller may receive one or more UE-level RSs from one or more terminals in the first cell, and may transmit, to the base station, a UE-level measurement report including a result of measuring RSRP of the received one or more UE-level RSs. The one or more terminals in the first cell may be remaining terminals other than the terminal in the first cell.

According to various embodiments disclosed herein, the controller may, in case that the second cell is selected as an aggressor bell, based on the cell-level measurement report, receive scheduling information configured in view of CLI with the one or more terminals positioned in the second cell from the base station, and may perform uplink transmission to the base station, based on the scheduling information.

According to various embodiments disclosed herein, cell-level RSs received from multiple cells adjacent to the first cell may be different from each other with regard to the multiple cells, respectively.

According to various embodiments disclosed herein, the information indicating that CLI measurement is triggered may include a measurement object message, and the measurement object message may include information on transmission resources of the cell-level RSs, respectively.

As described above, a base station device in a wireless communication system according to various embodiments disclosed herein may include a transceiver, a memory, and a controller. The controller may, in case that channel quality information included in a channel status information (CSI) report received from a terminal is smaller than a first threshold, select the terminal as a victim terminal, may transmit, to the victim terminal, information indicating that CLI measurement is triggered, may receive, from the terminal, cell-level measurement report including a result of measuring reference signal received power (RSRP) of multiple cell-level reference signals (RSs) of multiple cells adjacent to a first cell in which the terminal is positioned, after the CLI measurement is triggered, and may select, based on the cell-level measurement report, a cell corresponding to RSRP equal to/higher than a second threshold as an aggressor cell. The multiple cell-level RSs may be transmitted with an identical sequence on an identical radio resource, and the first threshold and the second threshold may be different from each other.

According to various embodiments disclosed herein, the controller may receive, from the terminal, a UE-level measurement report including a result of measuring RSRP of one or more UE-level RSs of the aggressor cell, and may select, based on the UE-level measurement report, a terminal corresponding to RSRP equal to/higher than a third threshold as an aggressor terminal.

According to various embodiments disclosed herein, the controller may, in case that one or more aggressor terminals are selected based on the UE-level measurement report, transmit, to the terminal, scheduling information configured in view of CLI with the one or more aggressor terminals, and may receive uplink data from the terminal, based on the scheduling information.

According to various embodiments disclosed herein, cell-level RSs received from multiple cells adjacent to the first cell may be different from each other with regard to the multiple cells, respectively.

According to various embodiments disclosed herein, the information indicating that CLI measurement is triggered may include a measurement object message, and the measurement object message may include information on transmission resources of the cell-level RSs, respectively.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the components included in the present disclosure are expressed in a singular or plural form. However, the singular or plural expression is appropriately selected according to a proposed situation for the convenience of explanation, the present disclosure is not limited to a single component or a plurality of components, the components expressed in the plural form may be configured as a single component, and the components expressed in the singular form may be configured as a plurality of components.

Meanwhile, while the specific embodiment has been described in the explanations of the present disclosure, it will be noted that various changes may be made therein without departing from the scope of the present disclosure. Therefore, the scope of the present disclosure is not limited and defined by the described embodiment and is defined not only the scope of the claims as below but also their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:

in case that channel quality information included in a channel status information (CSI) report received from a user equipment (UE) is less than a first threshold, identifying the UE as a victim UE;

transmitting, to the victim UE, information indicating that CLI measurement is triggered;

after the CLI measurement is triggered, receiving, from the UE, a cell-level measurement report comprising a result of measuring reference signal received power (RSRP) of multiple cell-level reference signals (RSs) of multiple cells adjacent to a first cell in which the UE is positioned; and identifying, based on the cell-level measurement report, a cell corresponding to RSRP greater than or equal to a second threshold as an aggressor cell, wherein the multiple cell-level RSs are transmitted with an identical sequence on an identical radio resource, and the first threshold and the second threshold are different from each other.

2. The method of claim 1, further comprising:

receiving, from the UE, a UE-level measurement report comprising a result of measuring RSRP of one or more UE-level RSs of the aggressor cell; and identifying, based on the UE-level measurement report, a UE corresponding to RSRP greater than or equal to a third threshold as an aggressor UE.

3. The method of claim 2, further comprising:

in case that one or more aggressor UEs are identified based on the UE-level measurement report, transmitting, to the UE, scheduling information configured in view of CLI with the one or more aggressor UEs; and receiving uplink data from the UE, based on the scheduling information.

4. The method of claim 1, wherein cell-level RSs received from multiple cells adjacent to the first cell are different from each other with regard to the multiple cells, respectively.

5. The method of claim 4, wherein the information indicating that CLI measurement is triggered comprises a measurement object message, and the measurement object message comprises information on transmission resources of the cell-level RSs, respectively.

6. A base station in a wireless communication system, the base station comprising:

a transceiver; and at least one processor coupled with the transceiver and configured to:

in case that channel quality information included in a channel status information (CSI) report received from a user equipment (UE) is less than a first threshold, identify the UE as a victim UE;

transmitting, to the victim UE, information indicating that CLI measurement is triggered;

after the CLI measurement is triggered, receive, from the UE, cell-level measurement report comprising a result of measuring reference signal received power (RSRP) of multiple cell-level reference signals (RSs) of multiple cells adjacent to a first cell in which the UE is positioned; and identify, based on the cell-level measurement report, a cell corresponding to RSRP greater than or equal to a second threshold as an aggressor cell, and wherein the multiple cell-level RSs are transmitted with an identical sequence on an identical radio resource, and the first threshold and the second threshold are different from each other.

7. The base station of claim 6, wherein the at least one processor is configured to:

receive, from the UE, a UE-level measurement report comprising a result of measuring RSRP of one or more UE-level RSs of the aggressor cell; and identify, based on the UE-level measurement report, a UE corresponding to RSRP greater than or equal to a third threshold as an aggressor UE.

8. The base station of claim 7, wherein the at least one processor is configured to:

in case that one or more aggressor UEs are identified based on the UE-level measurement report, transmit, to the UE, scheduling information configured in view of CLI with the one or more aggressor UEs; and receive uplink data from the UE, based on the scheduling information.

9. The base station of claim 6, wherein cell-level RSs received from multiple cells adjacent to the first cell are different from each other with regard to the multiple cells, respectively.

10. The base station of claim 9, wherein the information indicating that CLI measurement is triggered comprises a measurement object message, and the measurement object message comprises information on transmission resources of the cell-level RSs, respectively.

* * * * *